US012809707B2

(12) United States Patent
Patil et al.

(10) Patent No.: US 12,809,707 B2
(45) Date of Patent: Nov. 24, 2026

(54) MULTIMODAL USER EXPERIENCE DEGRADATION DETECTION

(71) Applicant: Intel Corporation, Santa Clara, CA (US)

(72) Inventors: Vijayalaxmi Patil, Bangalore (IN); Makarand Ramesh Muley, Nanded (IN); Farnaz Abdollahi, Lake Zurich, IL (US); Jamel Tayeb, Hillsboro, OR (US); Tamoghna Ghosh, Bangalore (IN); Michael D. Rosenzweig, Queen Creek, AZ (US); Shreerekha Balachandar, Seattle, WA (US)

(73) Assignee: INTEL PRODUCTS IP LLC, Santa Clara, CA (US)

( * ) Notice: Subject to any disclaimer, the term of this patent is extended or adjusted under 35 U.S.C. 154(b) by 201 days.

(21) Appl. No.: 17/855,947

(22) Filed: Jul. 1, 2022

(65) Prior Publication Data

US 2022/0334906 A1 Oct. 20, 2022

(51) Int. Cl.

| | |
|---|---|
| ***G06F 11/00*** | (2006.01) |
| ***G06F 11/07*** | (2006.01) |
| ***G06F 11/22*** | (2006.01) |
| ***G06F 11/32*** | (2006.01) |
| ***G06F 11/34*** | (2006.01) |

(52) U.S. Cl.
CPC ........ *G06F 11/079* (2013.01); *G06F 11/2263* (2013.01); *G06F 11/321* (2013.01); *G06F 11/3438* (2013.01)

(58) Field of Classification Search
CPC .. G06F 11/079; G06F 11/2263; G06F 11/321; G06F 11/3438
USPC ........................................................ 714/1–57
See application file for complete search history.

(56) References Cited

U.S. PATENT DOCUMENTS

| | | | | |
|---|---|---|---|---|
| 2013/0159774 | A1* | 6/2013 | Budnik | G06F 11/3688 714/33 |
| 2014/0298093 | A1* | 10/2014 | Cook | G06F 11/0706 714/27 |
| 2015/0033086 | A1* | 1/2015 | Sasturkar | G06F 11/079 714/57 |
| 2016/0004584 | A1* | 1/2016 | Nagai | H04L 41/065 714/37 |
| 2016/0092290 | A1* | 3/2016 | Gerstl | G06F 11/0787 714/37 |

(Continued)

*Primary Examiner* — Sarai E Butler
(74) *Attorney, Agent, or Firm* — Alliance IP, LLC

(57) ABSTRACT

A degraded user experience, such as a user having to wait for an unresponsive application, can be automatically detected and classified. A user experience degradation detection network detects a degraded user experience based on a state of the computing system and a user interaction state. The computing system state can be based on telemetry data provided by the operating system, processor units, and other computing system components and resources, and the user interaction state can be based on user interactions with one or more input devices (e.g., keyboard, touchpad, mouse, touchscreen). A root cause of the degradation event (e.g., hardware, memory, network, or general responsiveness issue) can be classified using a multi-label classifier. An output report can include a snapshot of the system telemetry and user interaction data before, during, and after the degradation event.

24 Claims, 8 Drawing Sheets

(56) References Cited

U.S. PATENT DOCUMENTS

| | | | | |
|---|---|---|---|---|
| 2016/0103996 | A1* | 4/2016 | Salajegheh | G06F 21/316 726/25 |
| 2016/0180352 | A1 | 6/2016 | Chen et al. | |
| 2018/0095814 | A1* | 4/2018 | Patil | G06F 11/0769 |
| 2019/0163553 | A1 | 5/2019 | Ramegowda et al. | |
| 2022/0094612 | A1* | 3/2022 | Zhang | H04L 43/14 |
| 2022/0224683 | A1* | 7/2022 | Solano Gomez | G06N 20/00 |

* cited by examiner

MULTIMODAL USER EXPERIENCE DEGRADATION DETECTION

BACKGROUND

The degradation of a user's experience with a computing system can manifest itself in various fashions, such as overall system slowness, an unresponsive application, or sluggish video playback. User experience degradation can be the result of misconfigured software, a system that is underpowered or misconfigured for an intended workload, or other reasons. A poor user experience can be remediated by, for example, replacing a computing system with one that is more powerful or properly configured for an intended workload, proper configuration of software, or replacing a failing component (e.g., display, battery, memory).

DETAILED DESCRIPTION

Figure 1:
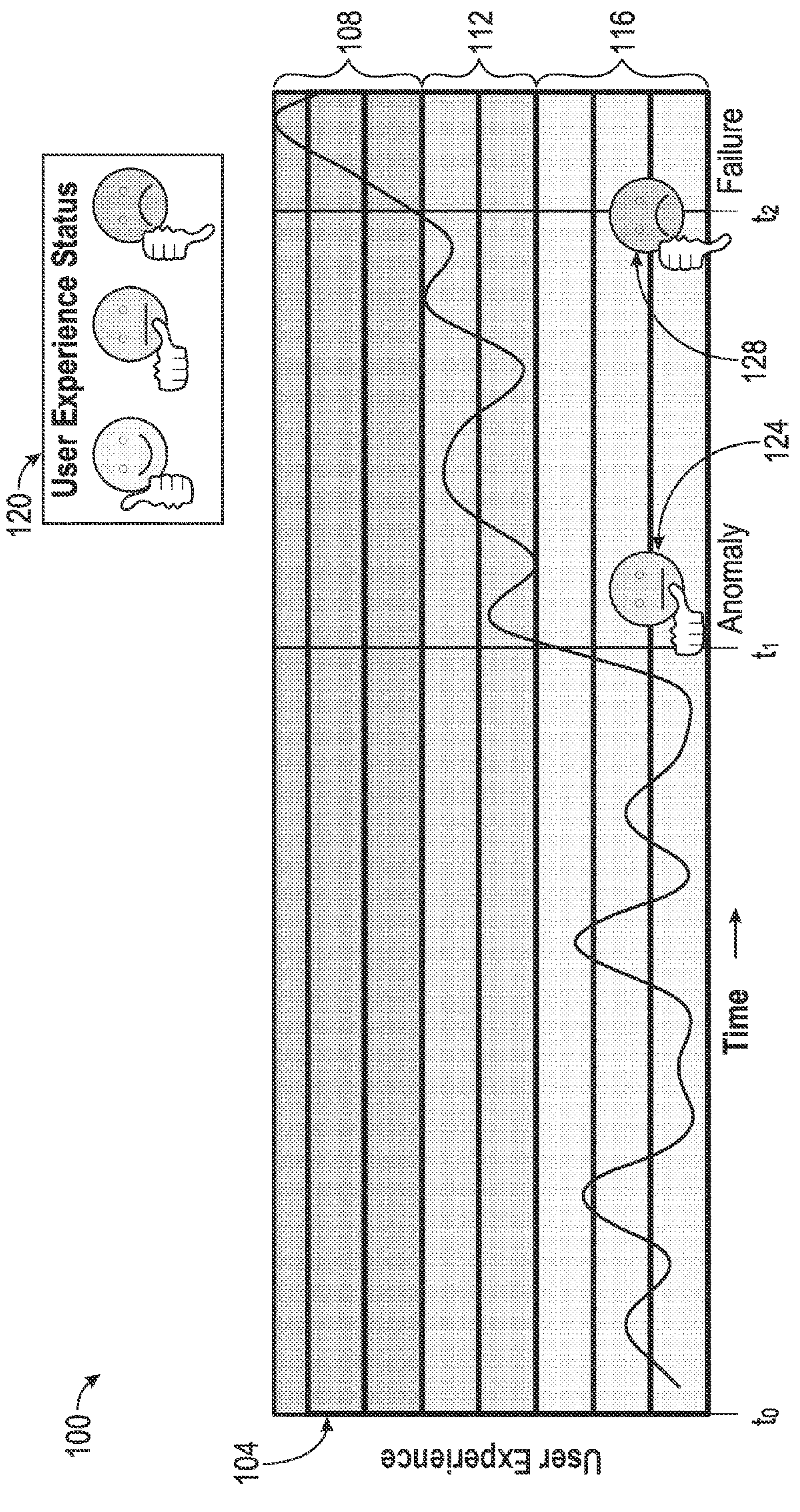
FIG. 1 illustrates an example user experience degradation scenario.

The timely detection of user experience degradation is an important part of providing a positive experience to a user. Examples of computing system user experience degradation include unexpected system shutdowns; unresponsive applications; operating system freezes; display of the "blue screen of death"; display blackouts; sluggish video playback; peripherals that do not operate as expected; unsuccessful software, firmware, or driver installations or updates; lost or unstable network connections; and abnormal user experience conditions resulting from aging or malfunctioning hardware, such as shortened battery life or system overheating. Even when using a computing system with a current hardware platform, users can experience occasional system slowness, application hangs, and other performance issues that can lead to a poor user experience.

Machine-learning (ML)-based technologies exist for detecting user experience degradation, but they can be limited by the availability of data that may be useful in root causing user experience degradation. For example, user experience degradation is often sporadic and sudden, and the exact time at which a user first experiences user experience degradation may not be known. Further, while a large amount of system telemetry data may be available for root cause analyses, this data may not be annotated or labeled with user experience degradation information (e.g., information indicating that user experience degradation exists, the severity of the degradation, the nature of degradation). A user may submit an incident report or help request to information technology (IT) personnel, but such a report or request may be submitted hours or days after the user experience degradation event occurred and information supplied with the report or request may be inaccurate or incomplete. Moreover, insights into system or device performance given by some existing user experience degradation tools are only provided at a high level and thus may not be actionable. Such insights may require further analysis by IT personnel to root cause user experience degradation events and decide upon an appropriate remedial course of action.

Some existing user experience degradation detection solutions collect simple count-based descriptive metrics (such as the number of application crashes, application launch times) and provide this data to the cloud. Cloud-based analytic tools are then applied to these metrics to provide reports on user experience, but these tools may not provide insights into what may be the root cause of user experience degradations, suggest or take remedial actions to address the user experience degradations, or suggest or take actions that can prevent a system failure from occurring or user experience degradation events to worsen (e.g., degradation events increasing in severity and/or frequency).

Disclosed herein are technologies that employ multimodal and meta-learning machine learning techniques to detect and classify user experience degradation events in real-time. The technologies disclosed herein utilize low-level system telemetry in combination with user interactions with a system to detect user experience degradations. A user experience degradation detection network detects the presence of a degraded user experience based on a state of the computing system and a user interaction state. The system state can be based on telemetry data provided by the operating system, processor units, and other computing system components and resources, and the user interaction state can be based on user interactions with one or more input devices (keyboard, touchpad, mouse, etc.). The degradation detection network can be trained on the system state information and the user state information annotated with labels indicating degraded user experiences. These annotations can be automatically generated based on the user interaction information or provided by a user desiring to record their frustration with a degraded user experience. A root cause of the degradation event can be classified using a multi-label classifier. For example, the classifier can classify the root cause as being due to hardware, software, network, or general responsiveness issue. An output report, which can be provided to the computing system user or IT personnel, can include a snapshot of the system telemetry and user interaction data before, during, and after the time of the degradation event.

The technologies disclosed herein have at least the following advantages. First, proactive detection and root causing of user experience degradation can reduce the risk and/or frequency of hardware failures. Second, a user can be alerted to act or restart a system prior to a disruptive event. Third, the need for a user to submit an IT ticket or report can be reduced or eliminated. Fourth, providing actionable insights and root causes of user experience degradation events can help IT personnel make more informed and more efficient decisions. Fifth, timely root causing of system malfunctions can improve user base and IT team productivity. Sixth, IT personnel can proactively take actions based on detected user experience degradation events before computer system failures occur.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or in any other manner. "Connected" may indicate elements are in direct physical or electrical contact with each other and "coupled" may indicate elements cooperate or interact with each other, but they may or may not be in direct physical or electrical contact. Furthermore, the terms "comprising," "including," "having," and the like, as used with respect to embodiments of the present disclosure, are synonymous.

The term "real-time" as used herein can refer to events or actions that occur some delay after other events. For example, the real-time detection and classification of user experience degradations can refer to the detection of user experience degradation events some delay after capturing the system state and the user interaction state of the system. This delay can comprise the time it takes to generate system state vectors from system data, to generate user interaction state vectors from user interaction data, and for the degradation detection network to operate on these vectors to detect a user experience degradation event. Further, the real-time classification of the root cause of a detected user experience degradation event can refer to classifying a root cause some delay after detection of a user experience degradation event. This delay can comprise the time it takes for a root cause classification network to classify a root cause based on degradation event information, system state vectors, and user interaction state vectors.

As used herein, the term "integrated circuit component" refers to a packaged or unpackaged integrated circuit product. A packaged integrated circuit component comprises one or more integrated circuit dies mounted on a package substrate with the integrated circuit dies and package substrate encapsulated in a casing material, such as a metal, plastic, glass, or ceramic. In one example, a packaged integrated circuit component contains one or more processor units mounted on a substrate with an exterior surface of the substrate comprising a solder ball grid array (BGA). In one example of an unpackaged integrated circuit component, a single monolithic integrated circuit die comprises solder bumps attached to contacts on the die. The solder bumps allow the die to be directly attached to a printed circuit board. An integrated circuit component can comprise one or more of any computing system component described or referenced herein or any other computing system component, such as a processor unit (e.g., system-on-a-chip (SoC), processor core, graphics processor unit (GPU), accelerator, chipset processor), I/O controller, memory, or network interface controller.

An integrated circuit component can comprise one or more processor units (e.g., system-on-a-chip (SoC), processor core, graphics processor unit (GPU), accelerator, chipset processor, or any other integrated circuit die capable of executing software entity instructions). An integrated circuit component can further comprise non-processor unit circuitry, such as shared cache memory (e.g., level 3 (L3), level 4 (L4), or last-level cache (LLC)), controllers (e.g., memory controller, interconnect controller (e.g., Peripheral Component Interconnect express (PCIe), Intel® QuickPath Interconnect (QPI) controller, Intel® UltraPath Interconnect (UPI) controller)), snoop filters, etc. In some embodiments, the non-processor unit circuitry can collectively be referred to as the "uncore" or "system agent" components of an integrated circuit component. In some embodiments, non-processor unit circuitry can be located on multiple integrated circuit dies within an integrated circuit component and different portions of the non-processor unit circuitry (whether located on the same integrated circuit die or different integrated circuit dies) can be provided different clock signals that can operate at the same or different frequencies. That is, different portions of the non-processor unit circuitry can operate in different clock domains.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the software or firmware instructions are not actively being executed by the system, device, platform, or resource.

As used herein, the term "memory bandwidth" refers to the bandwidth of a memory interface between a last-level cache located in an integrated circuit component and a memory located external to the integrated circuit component.

As used herein the term "software entity" can refer to a virtual machine, hypervisor, container engine, operating system, application, workload, or any other collection of instructions executable by a computing device or computing system. The software entity can be at least partially stored in one or more volatile or non-volatile computer-readable media of a computing system. As a software entity can comprise instructions stored in one or more non-volatile memories of a computing system, the term "software entity" includes firmware.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

FIG. 1 illustrates an example user experience degradation scenario. A graph 100 illustrates user experience degrading over time. The vertical axis 104 of the graph indicates a user experience based on system telemetry information and regions 108, 112, and 116 of the graph 100 indicate that the system is providing a positive user experience, a user experience with anomalies, and a user experience in which failures are occurring, respectively. From a time to to a time $t_1$, the system is providing a positive user experience. From time $t_1$ through time $t_2$, the system is providing a user experience in which anomalies are occurring, and from time $t_2$ onwards, the system is providing a failing user experience. The graph 100 further illustrates a mapping of the telemetry-based user experience to a user experience status represented by icons 120. A smiling face with a thumb up icon (positive icon) indicates a positive user experience, a neutral face with a level thumb icon (neutral icon) indicates a user experience with anomalies, and a frowning face (negative icon) with a thumb down icon indicates a failing user experience. A neutral icon 124 represents the user experience status from time $t_1$ to $t_2$ and a negative icon 128 represents the user experience status from $t_2$ onwards. The technologies described herein can automatically annotate data representing a user's interaction with a computing system with information indicating the user's impression of their user experience with the computing system. As discussed in greater detail below, these annotations can contain information that signals a user experience anomaly or a failing user experience.

Figure 2:
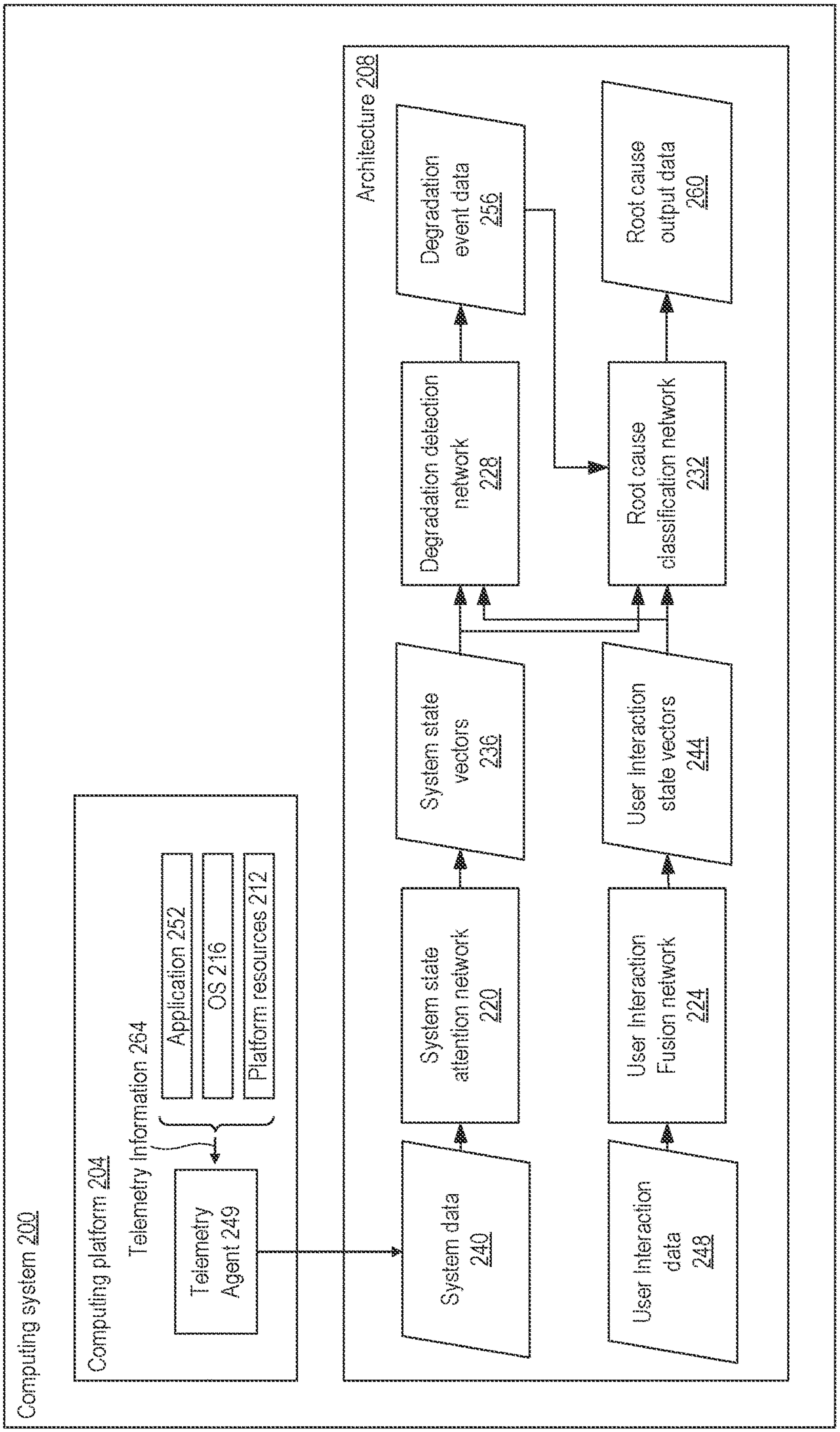
FIG. 2 illustrates a block diagram of an example computing system capable of detecting user experience degradation.

FIG. 2 illustrates a block diagram of an example computing system capable of detecting user experience degradation. The computing system (or device) 200 comprises a computing platform 204 upon which an architecture 208 capable of detecting user experience degradation of the computing system 200 is implemented. The computing system 200 can be any computing system or device (e.g., laptop, desktop) described or referenced herein. The computing platform 204 comprises platform resources 212 upon which an operating system 216 operates. The platform resources 212 comprise one or more integrated circuit components. Individual integrated circuit components comprise one or more processor units and may also comprise non-processor unit circuitry, as described above. The platform resources 212 can further comprise platform-level components such as a baseboard management controller (BMC). In one embodiment, the computing system 200 is an end user device that is part of an enterprise computing environment. The operating system 216 can be any type of operating system, such as Windows or a Linux-based operating system.

The architecture 208 comprises a system state attention network 220, a user interaction fusion network 224, a degradation detection network 228, and a root cause classification network 232. The architecture 208 detects user experience degradation events and classifies their root cause in real-time as follows. The degradation detection network 228 detects degradation events based on system state vectors 236 and user interaction state vectors 244. Degradation event data 256 comprises information indicating that one or more detected degradation events have occurred. The root cause classification network 232 classifies the root cause of a detected user experience degradation event based on degradation event data 256, system state vectors 236, and user interaction state vectors 244. Root cause output data 260 comprises information indicating the root cause of a degradation event.

The system state vectors 236 are generated by the system state attention network 220 based on system data 240. System data 240 comprises data representing the state of the computing system 200. User interaction state vectors 244 are generated by the user interaction fusion network 224 based on user interaction data 248. User interaction data 248 comprises data representing the state of user interaction with the computing system 200. A system state vector 236 represents the state of the computing system 200 at a point in time and a user interaction state vector 244 represents the state of user interaction with the computing system 200 at a point in time. When the architecture 208 is detecting user experience degradation events, the system data 240 and the user interaction data 248 are generated in real time as the computing system 200 is operated and interacted with.

The system data 240 can comprise any information pertaining to the state of the computing system 200, such as telemetry information 264 collected by a telemetry agent 249. The telemetry information 264 can comprise computing system configuration information, telemetry information provided by or associated with any component or resource of the computing platform 204 (e.g., platform resources 212, operating system 216, application 252), or any other information pertaining to the state of the computing system 200. The computing platform 204 can comprise both hardware and software components, such as the components described above (platform resources 212, operating system 216, application 252).

In some embodiments, telemetry information 264 can be made available by one or more performance counters or monitors, such as an Intel® Performance Monitor Unit (PMU). The performance counters or monitors can provide telemetry information at the processor unit (e.g., core), integrated circuit component, or platform level. Telemetry information 264 can comprise one or more of the following: information indicating the number of processor units in an integrated circuit component, information indicating the power consumption of an integrated circuit component, information indicating an operating frequency of an integrated circuit component, and information indicating an operating frequency of individual processor units located within an integrated circuit component.

Telemetry information 264 can further comprise processor unit active information indicating an amount of time a processor unit has been in an active state and processor unit idle information indicating an amount of time a processor unit has been in a particular idle state. Processor unit active information and processor unit idle information can be provided as an amount of time (e.g., ns) or a percentage of time over a monitoring period (e.g., the time since telemetry information for a particular metric was last provided by a computing platform component). For processor units that have multiple idle states, processor unit idle information can be provided for the individual idle states. For processor units that have multiple active states, processor unit active information can be provided for the individual active states. Processor unit active information and processor unit idle information can be provided for the individual processor units in an integrated circuit component.

As used herein, the term "active state" when referring to the state of a processor unit refers to a state in which the processor unit is executing instructions. As used herein, the term "idle state" means a state in which a processor unit is not executing instructions. Modern processor units can have various idle states with the varying idle states being distinguished by, for example, how much total power the processor unit consumes in the idle state and idle state exit costs (e.g., how much time and how much power it takes for the processor unit to transition from the idle state to an active state).

Idle states for some existing processor units can be referred to as "C-states". In one example of a set of idle states, some Intel® processors can be placed in C1, C1E, C3, C6, C7, and C8 idle states. This is in addition to a C0 state, which is the processor's active state. P-states can further describe the active state of some Intel® processors, with the various P-states indicating the processor's power supply voltage and operating frequency. The C1/C1E states are “auto halt” states in which all processes in a processor unit are performing a HALT or MWAIT instruction and the processor unit core clock is stopped. In the C1E state, the processor unit is operating in a state with its lowest frequency and supply voltage and with PLLs (phase-locked loops) still operating. In the C3 state, the processor unit's L1 (Level 1) and L2 (Level 2) caches are flushed to lower-level caches (e.g., L3 (Level 3) or LLC (last level cache)), the core clock and PLLs are stopped, and the processor unit operates at an operating voltage sufficient to allow it to maintain its state. In the C6 and deeper idle states (idle states that consume less power than other idle states), the processor unit stores its state in memory and its operating voltage is reduced to zero. As modern integrated circuit components can comprise multiple processor units, the individual processor units can be in their own idle states. These states can be referred to as C-states (core-states). Package C-states (PC-states) refer to idle states of integrated circuit components comprising multiple cores.

In some embodiments, where a processor unit can be in one of various idle states, with the varying idle states being distinguished by how much power the processor unit consumes in the idle state, the processor unit active information can indicate an amount of time that a processor unit has been in an active state or a shallow idle state or a percentage of time that the processor unit has been in an active state or a shallow idle state. In some embodiments, the shallow idle states comprise idle states in which the processor units do not store their state to memory and do not have their operating voltage reduced to zero.

Telemetry information 264 can further comprise one or more of the following: information indicating one or more operating frequencies of the non-processor unit circuitry of an integrated circuit component, information indicating an operating frequency of a memory controller of an integrated circuit component, information indicating a utilization of a memory external to an integrated circuit component by a software entity, information indicating a total memory controller utilization by software entities executing on an integrated circuit component, information indicating an operating frequency of individual interconnect controllers of an integrated circuit component, information indicating a utilization of an interconnect controller by a software entity, and information indicating a total interconnect controller utilization by the software entities executing on an integrated circuit component.

The telemetry information relating to non-processor unit circuitry can be provided by one or more performance monitoring units located in the portion of the integrated circuit component in which the non-processor units are located. In some embodiments, telemetry information indicating memory utilization is provided by the memory bandwidth monitoring component of Intel® Resource Director technology. In some embodiments, the telemetry information indicating an interconnect controller utilization can be related to PCIe technology, such as a utilization of a PCIe link.

Telemetry information 264 can further comprise one or more of the following: software entity identification information for software entities executing on an integrated circuit component, a user identifier associated with a software entity, information indicating processor unit threads and software entities associated with the processor unit core threads.

Telemetry information 264 can further comprise computing system topology or configuration information, which can comprise, for example, the number of integrated circuit components in a computing system, the number of processor units in an integrated circuit component, integrated circuit component identifying information and processor unit identifying information. In some embodiments, topology information can be provided by operating system commands, such as NumCPUs, NumCores, CPUsPerCore, CPUInfo, and CPUDetails. Computing system configuration information can comprise information indicating the configuration of one or more parameters (e.g., settings, register) of the system. These parameters can be system-level, platform-level, integrated circuit component-level, or integrated circuit die component-level (e.g., core-level) parameters.

In some embodiments, telemetry information 264 can be provided by plugins to an operating system daemon, such as the Linux collectd daemon turbostat plugin, which can provide information about an integrated circuit component topology, frequency, idle power-state statistics, temperature, power usage, etc. In applications that are DPDK-enabled (Data Plane Development Kit), platform telemetry information can be based on information provided by DPDK telemetry plugins. In some embodiments, platform telemetry information can be provided out of band as a rack-level metric, such as an Intel® Rack Scale Design metric.

The computing system 200 comprises a telemetry agent 249 that receives the telemetry information 264. The telemetry agent 249 provides the received telemetry information 264 to the architecture 208 as system data 240. The telemetry agent 249 can send telemetry information 264 to the architecture 208 as it is received, periodically, upon request by the architecture 208 (e.g., upon request by the system state attention network 220) or another basis. For example, the application 252, the operating system 216, and platform resources 212 can provide telemetry information 264 to telemetry agent 249 at intervals on the order of ones of seconds, tens of seconds, or ones of minutes. In some embodiments, telemetry information 264 is generated in response to the occurrence of a system event. Examples of system events include the attachment or removal of a peripheral to the computing system 200, the connection or disconnection of the computing system 200 to a network, and the installation, upgrade, or removal of a software entity.

The telemetry information 264 can be pulled by the telemetry agent 249 (e.g., provided to the telemetry agent 249 in response to a request by the telemetry agent 249) or pushed to the telemetry agent 249 by any of the various components of the computing platform 204. In some embodiments, the telemetry agent 249 is a plugin-based agent for collecting metrics, such as telegraf. In some embodiments, the telemetry information 264 can be based on the Intel® powerstat telegraf plugin.

In some embodiments, the telemetry information 264 can be generated by system statistics daemon collectd plugins (e.g., turbostat, CPU, CPUFreq, DPDK_telemetry, Open vSwitch-related plugins (e.g., ovs_stats, ovs_events), python (which allows for the collection of user-selected telemetry), ethstat). In some embodiments, telemetry information can be made available by a baseboard management controller (BMC). Telemetry information can be provided by various components or technologies integrated into a processor unit, such as PCIe controllers. In some embodiments, platform telemetry information can be provided by various tools and processes, such as kernel tools (such as lspci, ltopo, dmidecode, and ethtool), DPDK extended statistics, OvS utilities (such as ovs-vsctl and ovs-ofctl), operating system utilities (e.g., the Linux dropwatch utility), and orchestration utilities.

The telemetry information 264 can be provided in various measures or formats, depending on the telemetry information being provided. For example, time-related telemetry information can be provided in an amount of time (e.g., ns) or a percentage of a monitoring period (the time between the provision of successive instances of telemetry information by a computing system component to the telemetry agent 249). For telemetry information relating to a list of cores, cores can be identified by a core identifier. Telemetry information 264 relating to utilization (e.g., physical processor unit utilization, virtual processor unit utilization, memory controller utilization, memory utilization, interconnect controller utilization) can be provided as, for example, a number of cycle counts, an amount of power consumed in watts, an amount of bandwidth consumed in gigabytes/second, or a percentage of a full utilization of the resource by a software entity. Telemetry information for processor units can be for logical or physical processor units. Telemetry information relating to frequency can be provided as an absolute frequency in hertz, or a percentage of a reference or characteristic frequency of a component (e.g., base frequency, maximum turbo frequency). Telemetry information related to power consumption can be provided as an absolute power number in watts or a relative power measure (e.g., current power consumption relative to a characteristic power level, such as TDP (thermal design power).

In some embodiments, the telemetry agent 249 can determine telemetry information based on other telemetry information. For example, an operating frequency for a processor unit can be determined based on a ratio of telemetry information indicating a number of processor unit cycle counts while a thread is operating on the processor unit when the processor unit is not in a halt state to telemetry information indicating a number of cycles of a reference clock (e.g., a time stamp counter) when the processor unit is not in a halt state.

In some embodiments, the computing platform 204 comprises one or more traffic sources that provide traffic to platform resources (e.g., processor unit, memory, I/O controller). In some embodiments, the traffic source can be a network interface controller (NIC) that receives inbound traffic to the computing system 200 from one or more additional computing systems over a communication link. In some embodiments, the telemetry information 264 is provided by performance monitors integrated into a traffic source.

Performance monitors at the platform level that can provide telemetry information 264 can comprise, for example, monitors integrated into a traffic source (e.g., NIC), a platform resource (e.g., integrated circuit component, processor unit (e.g., core)), and a memory controller performance monitor integrated into an integrated circuit component or a core. Performance monitors integrated into a computing component can generate metric samples for constituent components of the component, such as devices, ports, and sub-ports within a component. Performance monitors can generate metric samples for traffic rate, bandwidth and other metrics related to interfaces or interconnect technology providing traffic to a component (e.g., PCIe, Intel® compute express link (CXL), cache coherent interconnect for accelerators (CCIX®), serializer/deserializer (SERDES), Nvidia® NVLink, ARM Infinity Link, Gen-Z, Open Coherent Accelerator Processor Interface (OpenCAPI)). A performance monitor can be implemented as hardware, software, firmware, or a combination thereof.

Telemetry information 264 can further include per-processor unit (e.g., per-core) metrics such as instruction cycle count metrics, cache hit metrics, cache miss metrics, cache miss stall metrics, and branch miss metrics. A performance monitor can further generate memory bandwidth usage metrics samples, such as the amount of memory bandwidth used on a per-processor unit (e.g., per-core) basis, memory bandwidth used by specific component types (e.g., graphics processor units, I/O components) or memory operation (read, write). In some embodiments, a performance monitor can comprise Intel® Resource Director Technology (RDT). Intel® RDT is a set of technologies that enables tracking and control of shared resources, such as LLC and memory bandwidth used by applications, virtual machines, and containers. Intel® RDT elements include CMT (Cache Monitoring Technology), CAT (Cache Allocation Technology), MBM (Memory Bandwidth Monitoring), and MBA (Memory Bandwidth Allocation). The Intel® MBM feature of RDT can generate metrics that indicate the amount of memory bandwidth used by individual processor cores.

Performance monitors can also provide telemetry information 264 related to the bandwidth of traffic sent by a traffic source (e.g., NIC) to another component in the computing system 200. For example, a performance monitor can provide telemetry information indicating an amount of traffic sent by the traffic source over an interconnection (e.g., a PCIe connection) to an integrated circuit component that is part of the platform resources 212 or the amount of traffic bandwidth received from the traffic source by a platform resource 212.

Telemetry information 264 can further comprise information contained in operating system logs generated by the operating system in response to various events, a change in a state of the computing system or operating system, or on another basis.

Tables 1-3 illustrate example hardware-based, operating system-based and network-based metrics that can be provided as telemetry information 264. The telemetry information 264 can comprise metrics other than those listed in Tables 1-3. The metric names in Tables 1-3 are those used in one example data schema and metrics having different names can be used in other embodiments.

TABLE 1

Hardware-related metrics

| Metric | Description |
|---|---|
| HW:MEMORY_READ_BW:MBPS | Memory read bandwidth in Mbps. |
| HW:MEMORY_WRITE_BW:MBPS | Memory write bandwidth in Mbps. |
| HW:MEMORY_GT_REQS: COUNTPERSEC | No. of requests from graphic (GT) engine to memory (requests/sec). |
| HW:MEMORY_CPU_REQS: COUNTPERSEC | No. of requests from physical core to memory (requests/sec). |
| HW:MEMORY_IO_REQS: COUNTPERSEC | No. of requests from input/output engine to memory (requests/sec). |
| HW:CORE:TEMPERATURE: CENTIGRADE | Temperature per physical core (° C). Can be one temperature value per physical core with same time stamp. Higher value means CPU utilization is high. |

TABLE 1-continued

| Hardware-related metrics | |
|---|---|
| Metric | Description |
| HW:CORE:CPI | Average clock cycles per instruction (CPI) per physical core. Can be one value per physical core with same time stamp. |
| HW:PACKAGE:RAP:WATTS | Running average package (CPU) power in Watts. Higher value means higher processor unit activity level. |
| HW:CORE:ACTIVE:PERCENT | Percent of time physical core spent in active (e.g., C0 state) (active) state. Can be one value per physical core with same time stamp. Higher value means higher physical core activity level. |
| HW:CORE:AVG_FREQ:MHZ | Average frequency per physical core in MHz. Can be one value per physical core with same time stamp. Higher value means higher physical core utilization. |
| HW:CORE:C0:PERCENT | Percent of time physical core spent in active state (e.g., C0 state). One value per physical core with same time stamp. A high value means activity level in processor unit is high. |

TABLE 2

| Operating System-related metrics | |
|---|---|
| Metric | Description |
| OS:MEMORY:AVAILABLE_MBYTES | Amount of memory available for new or existing processes in MB. |
| OS:MEMORY:PAGE_FAULTS/SEC | Average number of memory pages faulted per second. It can be measured in number of pages faulted per second because only one page is faulted in each fault operation. Thus, this metric may be also equal to the number of page fault operations. This counter can include both hard faults (those that require disk access) and soft faults (where the faulted page is found elsewhere in physical memory.) Some processor units can handle large numbers of soft faults without significant consequence. However, hard faults, which require disk access, can cause significant delays. |

TABLE 2-continued

| Operating System-related metrics | |
|---|---|
| Metric | Description |
| OS:MEMORY:COMMIT_LIMIT | Total amount of memory that can be used on a system. It can be the sum of RAM and pagefile space. |
| OS:MEMORY: % COMMITTED_BYTES_IN_USE | Percent Committed Bytes In Use is the ratio of committed memory bytes to the commit memory limit. Committed memory can be the physical memory in use for which space has been reserved in the paging file should it need to be written to disk. The commit limit can be determined by the size of the paging file. If the paging file is enlarged, the commit limit increases and the ratio is reduced). This value can display the current percentage value. |
| OS:MEMORY:POOL_PAGED_BYTES | Pool Paged Bytes is the size, in bytes, of the paged pool, an area of the system virtual memory that is used for objects that can be written to disk when they are not being used. This value can display the last observed value only. |
| OS:MEMORY: FREE_SYSTEM_PAGE_TABLE_ENTRIES | Free System Page Table Entries is the number of page table entries not currently in use by the system. This value can display the last observed value only. |
| OS:MEMORY: POOL_NONPAGED_BYTES | Pool Nonpaged Bytes is the size, in bytes, of the nonpaged pool, an area of the system virtual memory that is used for objects that cannot be written to disk but must remain in physical memory as long as they are allocated. This counter can display the last observed value only. |
| OS:PHYSICALDISK: DISK_BYTES/SEC:TOTAL | Disk Bytes/sec is the rate bytes are transferred to or from a disk during write or read operations. |
| OS:PHYSICALDISK: AVG_DISK_SEC/WRITE_TOTAL | Avg. Disk sec/Write is the average time, in seconds, of a write of data to a disk. |
| OS:PHYSICALDISK: AVG_DISK_SEC/READ_TOTAL | Avg. Disk sec/Read is the average time, in seconds, of a read of data from a disk. |

TABLE 2-continued

| Operating System-related metrics | |
|---|---|
| Metric | Description |
| OS:PHYSICALDISK: AVG._DISK_QUEUE_LENGTH:TOTAL | Avg. Disk Queue Length is the average number of both read and write requests that were queued for a selected disk during the sample interval. |
| OS:LOGICALDISK: AVG._DISK_QUEUE_ LENGTH:_TOTAL | Avg. Disk Queue Length is the average number of both read and write requests that were queued for a selected disk during the sample interval. |
| OS:PROCESS: TOP_PROCESS_ELAPSED_TIME:MS | Elapsed time of the pulling frequency. For example, this element shows the amount of time elapsed since the last time data was logged for each of the top processes. |
| OS:PROCESS: OP_EXECNAME_BY_CPUUTIL | Top processes executable name sorted by CPU utilization having a CPU utilization above a threshold (e.g., 3%). |
| OS:PROCESS: OP_EXEC_CPUUTIL:PERCENT | Actual CPU utilization numbers, for each of the processes logged in the previous element. |
| OS:PROCESS: TOP_EXECNAME_BY_IO_ READWRITE_BW | Top processes executable name sorted by disk or I/O utilization having I/O utilization above a threshold (3%). |
| OS:PROCESS: TOP_EXEC_BY_IO_READ_ WRITE_BW:KBPS | Actual disk or I/O utilization numbers, for each of the processes logged in the previous element. |
| OS:PROCESSOR: %_INTERRUPT_TIME:TOTAL | The number of times the processor unit is interrupted per second, e.g., by a disk controller or NIC. If this value is consistently over 1000, there might be a problem with one or more device. |
| OS:PROCESSOR:%_USER_ TIME:TOTAL | Percentage of time spent running application code. Generally, the higher this value, the better. |
| OS:PROCESSOR: %_PRIVILEGED_TIME:TOTAL | Percent Privileged Time is the percentage of elapsed time that the process threads spent executing code in privileged mode. |
| OS:SYSTEM:CONTEXT_ SWITCHES/SEC | Context Switches/sec is the combined rate at which all processors on a device are switched from one thread to another. |
| OS:SYSTEM: PROCESSOR_QUEUE_LENGTH | The number of threads that are queued up and waiting for CPU time. If this value divided by the number of CPUs is less than 10, the system is probably running smoothly. |
| OS:SYSTEM:PERCENT_DPC_TIME | DPC is a "deferred procedure call", which is a hardware interrupt that runs at a lower priority. If % DPC Time is greater 20%, there is likely a hardware or driver problem. |

TABLE 3

| Network-related metrics | |
|---|---|
| Metric | Description |
| NET:WIFI:INTERFACE:STATE | State of a network interface: Idle, Scanning, Connecting, Authenticating, Connected, Disconnecting, Disconnected, Unavailable, Failed, Disabled. |
| NET:WIFI:AP:CONNECTED\LEVEL: %: [Current_Bandwidth] | Records the signal quality of the network via the connected access point. A value of zero implies an actual RSSI signal strength of −100 dbm. A value of 100 implies an actual RSSI (received signal strength indicator) of −50 dBm. |
| NET:WIFI: INTERFACE:BYTES_ TOTAL_PER_SEC | Rate at which bytes are sent and received over each network adapter, including framing characters. Bytes total/sec is a sum of bytes received/sec and bytes sent/sec. |
| NET: NETWORK_INTERFACE: BYTES_SENT/SEC | For each network adapter, the rate at which bytes are sent over each network adapter, including framing characters. |
| NET:NETWORK_INTERFACE: BYTES_RECEIVED/SEC | For each network adapter, the rate at which bytes are received over each network adapter, including framing characters. |
| NET:WIFI:NETWORK_INTERFACE: OUTPUT_QUEUE_LENGTH | The number of network packets waiting to be placed on the network. This value is the length of the output packet queue (in packets). If this is longer than 2, delays occur. Because NDIS Network Driver Interface Specification (NDIS) queues the requests, this length should be zero in operating systems employing NDIS. |

TABLE 3-continued

| Network-related metrics | |
|---|---|
| Metric | Description |
| NET:WIFI:NETWORK_INTERFACE: PACKETS_OUTBOUND_ERRORS | Indicates the number of outbound packets that could not be transmitted because of errors. |

The system state attention network 220 encodes the state of the computing system as represented by the system data 240 into system state vectors 236. System state vectors 236 comprise one or more system state vectors, each vector comprising information (e.g., a set of floating-point numbers) indicating a state of the computing system 200 at a point in time. In some embodiments, a system state vector has a reduced dimensionality compared to that of the system data 240. For example, if the system data 240 comprises 30 values of telemetry information, a system state vector may comprise fewer than 30 values. This reduction of dimensionality is achieved by the system state attention network 220 taking advantage of dependencies and multiple correlations between metrics comprising the system data 240. In this manner, the system state attention network 220 can be considered to be selecting the system metrics used to represent a state of the computing system 200.

User interaction data 248 comprises information indicating the interaction of a user with the computing system 200. The user interaction data 248 can comprise information indicating user interaction with one or more input devices of the computing system 200, such as a mouse, keypad, keyboard, and touchscreen. User interaction data 248 can comprise, for example, information indicating a mouse position, a state of a mouse button, which key of a keyboard has been pressed, whether a power button or keyboard key has been pressed, the duration of a power button press, how long a keyboard key or a power button has been pressed, the location of a touch to the touch screen, that a system has been restarted, the time at which a system was restarted, that the computing system has been disconnected from an external power supply, and the like.

The user interaction data 248 can be provided by device drivers (e.g., mouse driver, keyboard driver, touchscreen driver), the operating system, or another component of the computing system 200. The user interaction data 248 can be provided to the user interaction fusion network 224 on a periodic or another basis. In some embodiments, the user interaction data 248 can comprise information derived from other user interaction data 248. For example, user interaction data can comprise information that a specific gesture has been made with the mouse (e.g., a jitter gesture—a rapid back-and-forth movement with the mouse) or to the touchscreen (e.g., a pinch, expand, tap gesture). For example, user interaction data 248 can comprise information indicating that a “jitter” gesture has been made based on mouse position data and mouse position-rate-of-change data, or that a pinch, expand, or tap gesture has been made to the touchscreen based on the location of one or more touches to the screen and the movement of those touches to the screen over a time period.

The user interaction fusion network 224 encodes the state of user interaction with the computing system 200 as represented by the user interaction data 248 into user interaction state vectors 244. User interaction state vectors 244 comprise one or more user interaction state vectors, each vector comprising information (e.g., a set of floating-point numbers) indicating a state of a user’s interaction with the computing system 200 at a point in time. In some embodiments, a user interaction state vector 244 has a reduced dimensionality compared to that of the user interaction data 248. For example, if the user interaction data 248 comprises 20 user interaction data values, a user interaction state vector 244 may comprise fewer than 20 values. This reduction of dimensionality is achieved by the user interaction fusion network 224 taking advantage of dependencies and multiple correlations between values in the user interaction data 248. In this manner, the user interaction fusion network 224 can be considered to be selecting the user interaction parameters or metrics that can be used to represent a state of user interaction with the computing system 200. In some embodiments, the system state attention network 220 and the user interaction fusion network 224 are neural networks.

The architecture 208 can generate system state vectors 236 and user interaction state vectors 244 at periodic intervals or another basis (such as in response to user interaction events (a user interacting with the system after a period of user interaction inactivity) or any of the system events described above). Each vector 236 or 244 can comprise information indicating an absolute or relative time (e.g., time stamp or information indicating the temporal relation of a vector to other vectors, such as an identification number or sequence number) corresponding to the system state and user interaction state represented by the system state vectors 236 and the user interaction state vectors 244, respectively. In some embodiments, the architecture 208 can store a predetermined number of recently generated vectors 236 and 244. In some embodiments, the architecture 208 can store the system data 240 and user interaction data 248 associated with stored system state and user interaction state vectors 236 and 244. In some embodiments, when a degradation event is detected, system state and user interaction state vectors 236 and 244 and corresponding system data 240 and user interaction data 248 are stored for as long as the degradation detection network 228 determines that the degradation event is occurring. System state and user interaction state vectors 236 and 244 and corresponding system data 240 and user interaction data 248 from one or more points in time before a degradation event is detected and from one or more points in time after the end of a degradation event can be stored as well. System data 240 and user interaction data 248 saved before, during, and after a degradation event can be included in a user experience degradation event report. This data may aid personnel in determining why a degradation event has occurred and help them determine what remedial actions are to be taken.

The user interaction state vectors 244 can be annotated with user experience degradation information indicating a degraded user experience. The user interaction state vectors 244 can be annotated when the user interaction data 248 indicates that a user is frustrated or otherwise indicates the user is having a poor user experience, such as when the user interaction data 248 indicates a jiggle of a mouse input device (as indicated by the mouse position moving back and forth one or more times in a short time period), a keyboard key has been pressed more than a threshold number of times within a specified time period, a power button has been held down longer than a threshold number of seconds, one or more restarts of the computing system, holding down the power button long enough to cause the system to restart, and disconnection of the computing system from an external power supply.

User interaction state vectors 244 can also be annotated with user experience degradation information in response to user input indicating that the user is having a poor user experience. For example, a user can express their frustration with their user experience by submitting an IT help request, selecting an operating system or application user interaction element or feature that allows them to indicate that they are having a poor experience, etc.

Regardless of whether user experience degradation information annotations are automatically generated or manually provided by a user, user experience degradation information can comprise, for example, information that the user experience has been degraded and/or information indicating more details about the nature of the user experience degradation (e.g., information describing the user interaction event (mouse jiggle, repeated keystroke, system restart)).

The degradation detection network 228 is a neural network trained to detect user experience degradation events during operation of the computing system 200 in real-time. The degradation detection network 228 detects user experience degradation events based on system state vectors 236 and user interaction state vectors 244 provided to the degradation detection network 228 as the computing system 200 is in operation and being interacted with. The degradation detection network 228 can use system state vectors 236 from more than one point in time and user interaction state vectors from more than one point in time to detect a user interaction degradation event.

The degradation detection network 228 is trained based on system state vectors 236 and user interaction state vectors 244 annotated with user experience degradation information. The annotations provide a ground truth for the training of the degradation detection network 228. In some embodiments, when the degradation detection network 228 is detecting user interaction degradation events in real-time, the degradation detection network 228 operates on user interaction state vectors 244 that are not annotated. In other embodiments, automatically generated annotations are added to the user interaction state vectors while the degradation detection network 228 is detecting user experience degradation in real-time. These automatically generated annotations are used to verify the degradation detection network 228 and further improve the accuracy of the degradation detection network 228. Thus, the degradation detection network 228 can become personalized to a computing system and/or a user (or set of users) of the computing system over time.

The degradation detection network 228 can be a recurrent neural network trained to predict the system state and user interaction state (as indicated by the system state vectors and user interaction state vectors, respectively) of a next time period. If a trained degradation detection network 228 detects that the difference between a system state vector 236 and a user interaction state vector 244 for a point in time and the degradation detection network's 228 prediction for what the system state vector 236 and the user interaction state vector 244 should be for that point in time exceeds an error threshold, the degradation detection network 228 determines that there is a user experience degradation event. In some embodiments, the degradation detection network 228 can be a long short-term memory (LSTM) recurrent neural network.

The degradation detection network 228 generates degradation event data 256 in response to detecting a user experience degradation event, with the degradation event data 256 indicating that a user experience degradation event has occurred. As multiple system state and user interaction state vectors can be generated during a single user experience degradation event, the degradation detection network 228 can indicate that a degradation event exists for successive system state vectors 236 and user interaction state vectors 244 presented to the degradation detection network 228. The degradation event data 256 can comprise information indicating a start time, end time, and/or duration of a degradation event. Once the computing system returns to providing a positive user experience, and the system and user interaction states predicted by the degradation detection network 228 again match the incoming system state and user interaction state vectors 236 and 244, the degradation detection network 228 no longer detects a user experience degradation event.

The root cause classification network 232 classifies a root cause of a user experience degradation event. In some embodiments, the root cause classification network 232 is a multi-label classifier. The root cause classification network 232 classifies a user experience degradation event based on system state vectors 236 and user interaction state vectors 244. The root cause classification network 232 can classify a user experience degradation event based on one or more system state vectors 236 and one or more user interaction state vectors 244. The root cause classification network 232 can be trained based on system state vectors 236, user interaction state vectors 244, and annotation information indicating root causes for user experience degradation events. The annotation information indicating root causes for a user experience degradation event is used as a ground truth for verifying the root cause classification network 232.

The root cause classification network 232 can classify a root cause of a degradation event from a set of root causes (e.g., the set of root causes included in the annotations used to train the root cause classification network 232). In one embodiment, the set of root causes comprises a hardware responsiveness issue, a software responsiveness issue, a network responsiveness issue, and a general responsiveness issue. An example of a hardware responsiveness issue includes an overheating integrated circuit component (due to, for example, an aging component). Examples of software responsiveness issues include too many applications executing on the computing system at once and an application consuming a large amount of computing system resources (e.g., compute, memory, storage). An example of a network responsiveness issue includes I/O overutilization (due to, for example, too many I/O-intensive workloads utilizing the same interconnect).

After the degradation detection network 228 and the root cause classification network 232 have been trained, the architecture 208 can operate to detect degradations in the user experience provided by the computing system 200 in real-time. Upon detecting a user experience degradation event and classifying its root cause, the architecture 208 generates root cause output data 260. The root cause output data 260 can comprise information indicating one or more of the following: the presence of a user experience degradation event; degradation event start time; degradation event stop time; degradation event duration; degradation event severity; system data 240 (telemetry information 264) before, during, and after the user experience degradation event; and user interaction data 248 before, during, and after the user experience degradation event. The root cause output data 260 can be presented on a display that is part of or in wired or wireless communication with the computing system 200. In some embodiments, the root cause output data 260 can be sent to a remote computing system for display at the remote computing system where it can be reviewed by, for example, IT personnel for analysis or review. The root cause output data 260 can aid someone in determining what remedial action to take to reduce the chance that the user experience degradation event happens again.

The operation of the architecture 208 can thus be described as occurring in three stages—a training phase, a meta-learning root cause prediction stage, and an inference stage. In the training stage, system state vectors 236 and user interaction state vectors 244 describing historical system state and user interaction states are used to train the degradation detection network 228. The degradation detection network 228 is validated using historical system state vectors and the user interaction state vectors annotated with user interaction degradation information. The user interaction degradation information annotations can have been automatically generated by the architecture 208 or manually provided by a user. The user interaction degradation information is used as a ground truth to verify the performance of the degradation detection network 228.

In the meta-learning root causing stage the root cause classification network 232 is trained to classify a root cause of a detected user interaction degradation event using the trained degradation detection network 228, historical system state vectors and annotated user interaction state vectors. Again, user interaction state vectors 244 annotated with user interaction degradation information are used as a ground truth to verify the performance of the root cause classification network 232.

In the inference stage, system data 240 and user interaction data 248 are supplied to the architecture 208, which detects user experience degradation events and classifies their root cause. The root cause output data 260 generated by the architecture 208 can aid in determining what remedial actions are to be taken.

Figure 3:
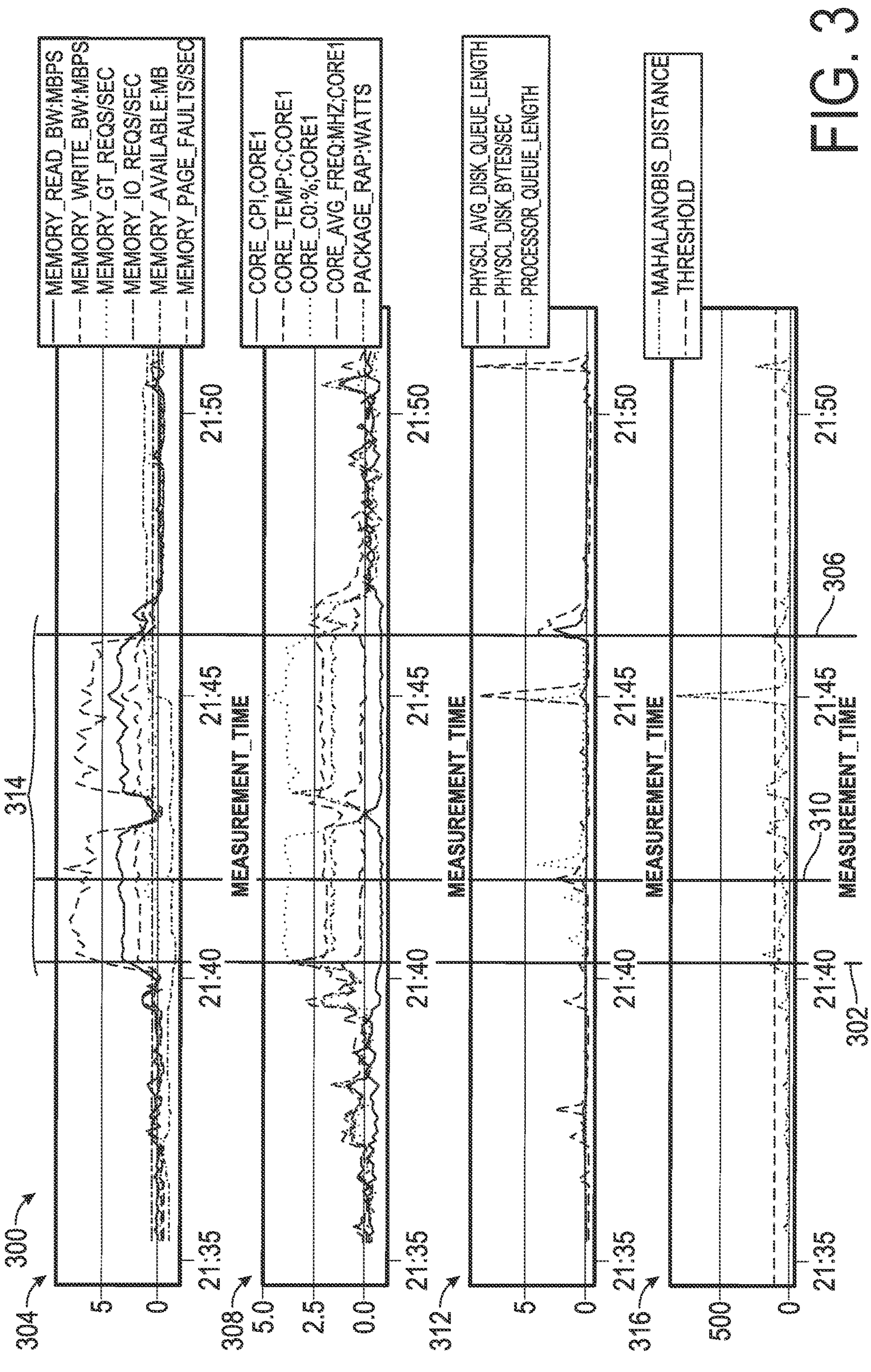
FIG. 3 illustrates an example detected user experience degradation event.

FIG. 3 illustrates an example detected user experience degradation event. The degradation event 314 is illustrated via a set of graphs 300 showing system data 240 and user interaction data 248 before, during, and after the degradation event 314. The degradation event 314 begins at a time 302 (21:40:16) and ends at a time 306 (21:46:06). A user-provided user experience degradation label (e.g., "Application runs slow or fails to respond as expected") is annotated in graphs 300 at a time 310. Graphs 304, 308, 312, and 316 illustrate the values of various metrics over time. Graph 304 illustrates a series of memory-related metrics showing intensive memory activity during the degradation event 314. Graph 308 illustrates a series of performance metrics for a core and package-level power metric that show high core utilization and package power consumption during the degradation event 314. Graph 312 illustrates disk metrics and a processor queue length metric and shows spikes of high disk utilization and a large number of processor threads queued for execution during the degradation event 314. Graph 316 illustrates that the error (MAHALANOBIS_DISTANCE) between predicted and actual system state and user interaction state vectors exceeds the threshold (THRESHOLD) indicating the presence of a degraded user experience. In some embodiments, the threshold indicating the presence of a user experience degradation is established by the degradation detection network 228 based on system state and user interaction state vectors corresponding to positive or expected user experiences. The metrics illustrated in graphs 304, 308, 312, and 316 can be provided as part of the root cause output data 260. The root cause classification network 232 classifies the root cause of the degradation event 314 as a software responsiveness issue. Degradation event 314 is further given a degradation level (or score) of "high" given the event involves high utilization of memory, processor unit, and disk resources.

Figure 4A:
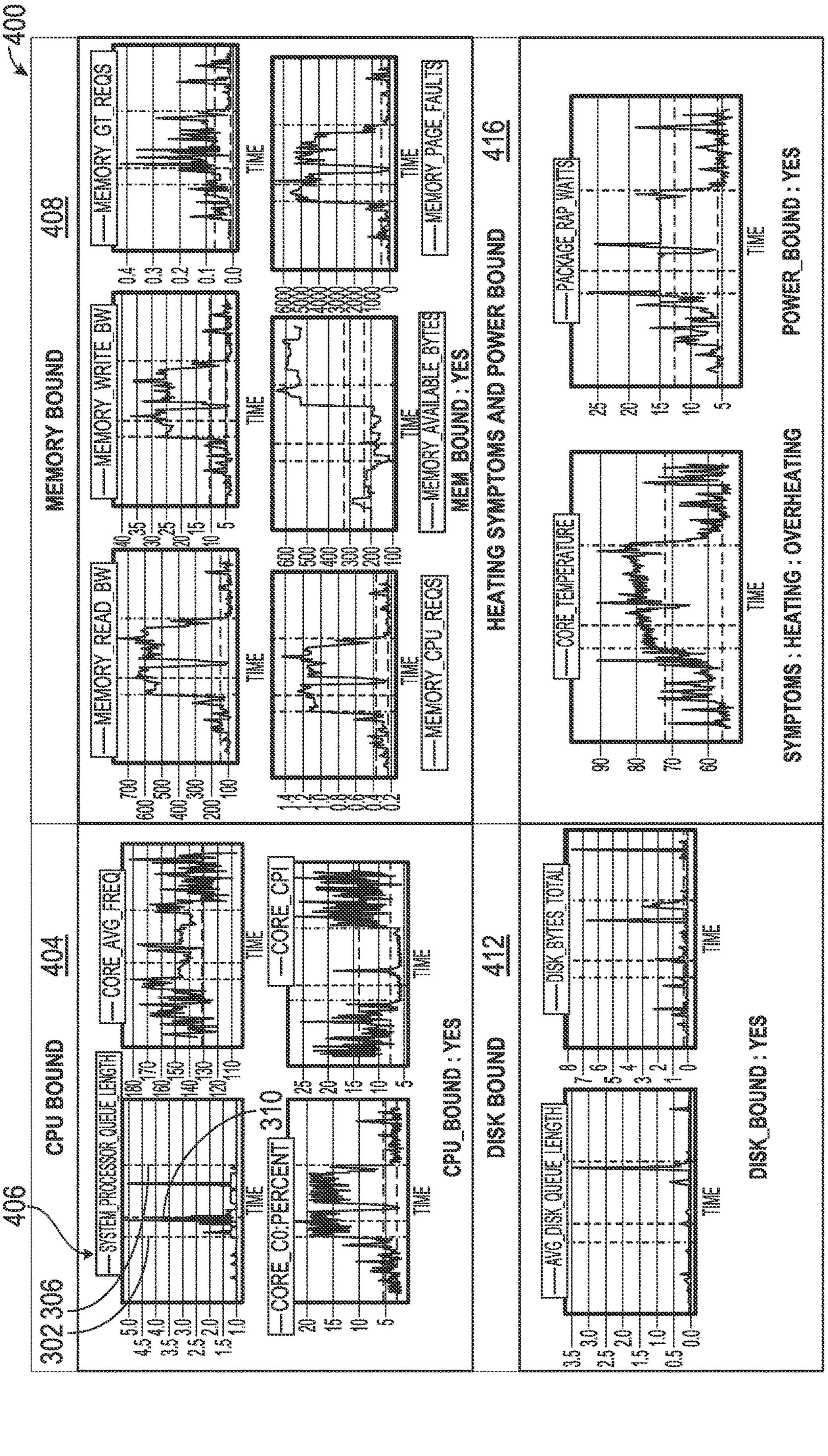
FIGS. 4A-4B illustrate an example root cause output report for the degradation event illustrated in FIG. 3.
Figure 4B:
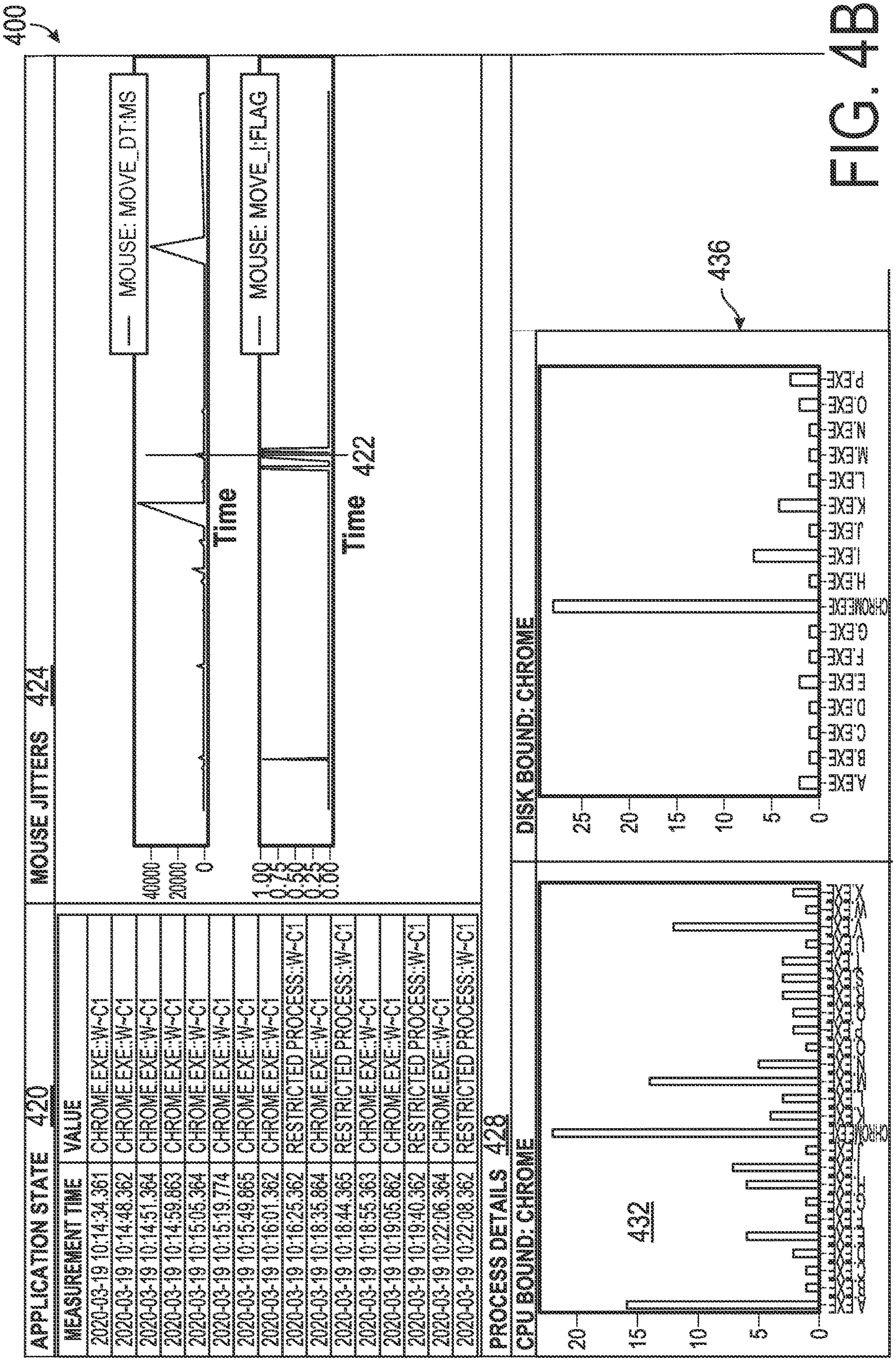

FIGS. 4A-4B illustrate an example root cause output report for the degradation event illustrated in FIG. 3. The architecture 208 can produce an output report, such as report 400, in response to a user experience degradation event having been detected and its root cause classified. The report 400 comprises a series of panes providing information pertaining to the performance of a computing system and user interaction with the computing system before, during, and after a user experience degradation event. Panes 404, 408, 412, and 416 illustrate graphs of various metrics that can indicate whether a computing system is limited by processor unit performance ("CPU Bound", pane 404), memory performance ("Memory Bound", pane 408), storage unit performance ("Disk Bound", pane 412), or illustrate thermal and power metrics ("Heating symptoms and Power Bound", pane 416). Each pane comprises a determination of the state of the computing system based on the metrics illustrated in each pane. For example, graph 406 in pane 404 illustrates the SYSTEM_PROCESSOR_QUEUE_LENGTH metric and times 302, 306, and 310 show degradation event start and end times, and user label annotation time. These start time, end time, and user label bars are shown in the graphs in panes 404, 408, 412, and 416, but are only labeled in graph 406. The other three graphs in pane 404 illustrate the CORE_AVE_FREQ, CORE_CO_PERCENT, and CORE_CPI metrics. Together, the graphs in pane 404 illustrate that the computing system is limited by processor unit performance (the graphs illustrate core throttling and overclocking) and the pane 404 comprises the determination "CPU_Bound: Yes".

Pane 408 comprises graphs of six memory-related metrics (MEMORY_RD_BW, MEMORY_WRITE_BW, MEMORY_GT_BW, MEMORY_CPU_REQS, MEMORY_AVAILABLE_BYTES, MEMORY_PAGE_FAULTS) illustrating a memory-intensive degradation event (the system is running out of RAM and is experiencing frequent page faults). Pane 408 further comprises the determination "MEM_BOUND: Yes". Pane 412 further comprises two graphs of disk-related metrics (AVG_DISK_QUEUE_LENGTH, DISK_BYTES_TOTAL) that illustrate that disk operations are waiting and a high disk access rate. Pane 412 comprises the determination "DISK_BOUND: Yes". Pane 416 comprises a temperature metric (CORE_TEMPERATURE) illustrating a higher processor unit temperature during the degradation event and a power metric (PACKAGE_RAP_WATTS) illustrating high integrated circuit component power consumption during the degradation event. The pane 416 further comprises the determinations "SYMPTOMS: HEATING: OVERHEATING" and "POWER_BOUND: Yes" to communicate processor unit overheating and high power consumption.

Turning to FIG. 4B, pane 420 illustrates the status of an active process during the degradation event and shows that the Chrome web browser application is busy. The application status presented in pane 420 is generated by an operating system-level API that indicates an application is busy with the "~" indicator. In some embodiments, the pane 420 can show the status of the active application that is consuming the most processing and/or disk resources as illustrated in pane 428. Pane 424 illustrates two mouse movement metrics (MOUSE: MOVE_DT: MS (indicating the amount of time a mouse is moving in a same direction), MOUSE: MOVE_I: FLAG (indicating that the mouse is moving)) that indicate the mouse is being jiggled at a time 422. Pane 428 comprises two graphs. Graph 432 illustrates the applications having the highest CPU utilization during the degradation event and their CPU utilization during the degradation event. Graph 436 illustrates the applications having the highest I/O read/write bandwidth during the degradation event and the amount of I/O read/write bandwidth utilized by each application during the degradation event. Graphs 432 and 436 illustrate that the Chrome application is the application utilizing the most CPU and disk resources.

Report 400 is just one example of an output report. In other embodiments, an output report can have more or fewer panes; panes with more or fewer graphs; or graphs with different metrics than those shown in report 400. The report 400 can be displayed on a display attached or connected to the computing system on which the user experience degradation was detected, stored for future retrieval, or sent to another computing system where it can be reviewed by, for example, IT personnel. In some embodiments, the report 400 can be implemented as a dashboard displayed on a display that is part of or connected to the computing system, or on a display that is part of or connected to a remote system.

Based on the information provided in a user experience degradation event output report, various remedial actions can be taken, resulting in various user experiences. In a first example, an output report can indicate that a processor unit is overheating. IT personnel may decide that the overheating signaled by the telemetry data in the output report indicates that the computing system is aging prematurely and decide to replace the computing system sooner than their organization's computing system refresh cycle would otherwise provide. Thus, the user receives an updated computing system before their computing system fails, and the user experiences less interruption than if they had to deal with a computing system that unexpectedly failed due to premature aging, submit an IT ticket, and wait on IT personnel for assistance.

In a second example, an output report can indicate that a degradation event's root cause is a memory responsiveness issue. IT personnel may push an operating system update to the computing system or, if the operating system is Windows®, cause a Windows® index file compression to occur. The user may experience little (endure an operating system update) or no (index file compression that can run in the background) interruption to their user experience for this degradation to be addressed.

In a third example, an output report can again indicate that a degradation event's root cause is a memory responsiveness issue. In this example, IT personnel may cause one or more notifications to pop up on the display to inform the user of a critical issue, such as a size of the "temp" folder exceeding a threshold size or the amount of free disk space falling below a threshold, and provide suggestions on how to remedy the issue, such as moving locally stored files to the cloud.

Additional example actionable insights and root causes provided by the disclosed technologies include detecting the frequency of system malfunctions, detecting an underpowered system or that a system is inappropriate for an intended workload, and detecting misconfigured or out-of-date software. Additional example remedial actions that can be taken include reconfiguring the computing system, providing a user with an updated computing system or a computing system that is more properly suited for executing intended workloads, and employing a ring deployment approach for future software to reduce disruption to a user base.

In one example of testing the user experience degradation detection technologies described herein, the disclosed technologies were tested using system data captured from operation of a computing system. Twenty percent of the captured system data (telemetry data) during operation of the computing system was used to test a user experience degradation model. The test system data was annotated with user-supplied labels indicating poor user experience. The test system data was not annotated with positive user experience labels indicating a good user experience. System data at timestamps not marked with a bad user experience label did not necessarily mean a good user experience as the user may have missed marking a user experience degradation. Thus, the test system data had an imbalanced user experience class (positive, negative) classification with potentially missing labels for the negative class. This made it difficult to compute standard accuracy metrics like F1-score/ROC (receiver operating characteristic) curve to measure model accuracy and false positive rate which are typical choices for class imbalance problems. For this example, for the training of the degradation detection network, the user-supplied labels were used as a ground truth. Table 4 provides the recall of this example user experience degradation detection model based on the technologies described herein for user groups with varying numbers of users.

TABLE 5

Recall for an example user experience degradation detection model

| Group | No. of users | No. of user labels | Recall |
|---|---|---|---|
| Group A | 8 | 107 | 77.0% |
| Group B | 9 | 64 | 93.0% |
| Group C | 11 | 198 | 80.0% |
| Group D | 13 | 164 | 76.0% |
| Group E | 15 | 213 | 90.0% |
| Group F | 19 | 199 | 88.0% |
| Group G | 26 | 398 | 93.0% |
| Group H | 28 | 342 | 92.0% |
| Group I | 37 | 480 | 72.0% |
| Overall | 166 | 2165 | 84.6% |

In one example of an implementation of a user experience degradation detection model utilizing the technologies described herein, the model was operated on a computing system with an Intel® i5-8350 processor with a base CPU clock frequency of 1.70 GHz, 16 GB of RAM, and operating the Windows® 10 operating system. During operation of the computing system with user experience degradation detection model running, the computing system operated at a 0.9% CPU usage rate, low DRAM bandwidth utilization, heap memory of about 235 MB, and a power consumption level of 145 mW, thus illustrating that user experience degradation detection models based on the technologies disclosed herein can run on an edge device without utilizing heavy compute and memory resources.

Figure 5:
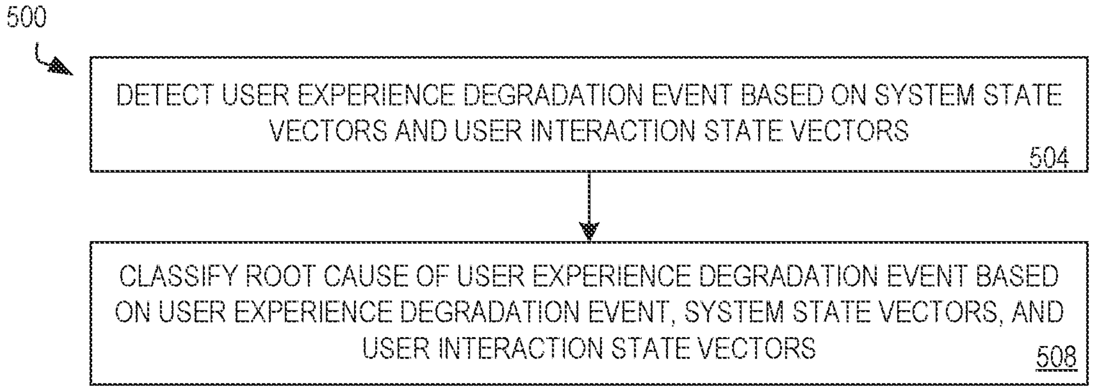
FIG. 5 illustrates an example method of detecting user experience degradation.

FIG. 5 illustrates an example method of detecting user experience degradation. The method 500 can be performed by, for example, a desktop computer. At 504, a computing system detects a user experience degradation event based on one or more system state vectors and one or more user interaction state vectors. Individual of the system state vectors represent a state of the computing system and individual of the user interaction state vectors represent a state of user interaction with the computing system at a point in time. At 508, the computing system classifies a root cause of the user experience degradation event, the classifying based on the user experience degradation event, the one or more system state vectors and the one or more user interaction state vectors.

In other embodiments, the method 500 can comprise one or more additional elements. For example, in some embodiments, the method 500 can further comprise generating the system state vectors based on system data. In other embodiments, the method 500 further comprises generating the one or more user interaction state vectors based on user interaction data. In yet other embodiments, the method 500 can further comprise causing display of information associated with the user experience degradation event information on a display. In still other embodiments, the method 500 can further comprise the computing system annotating the one or more user state vectors with user experience degradation information.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that hosts companies applications and data), and an edge data center (e.g., a data center, typically having a smaller footprint than other data center types, located close to the geographic area that it serves).

Figure 6:
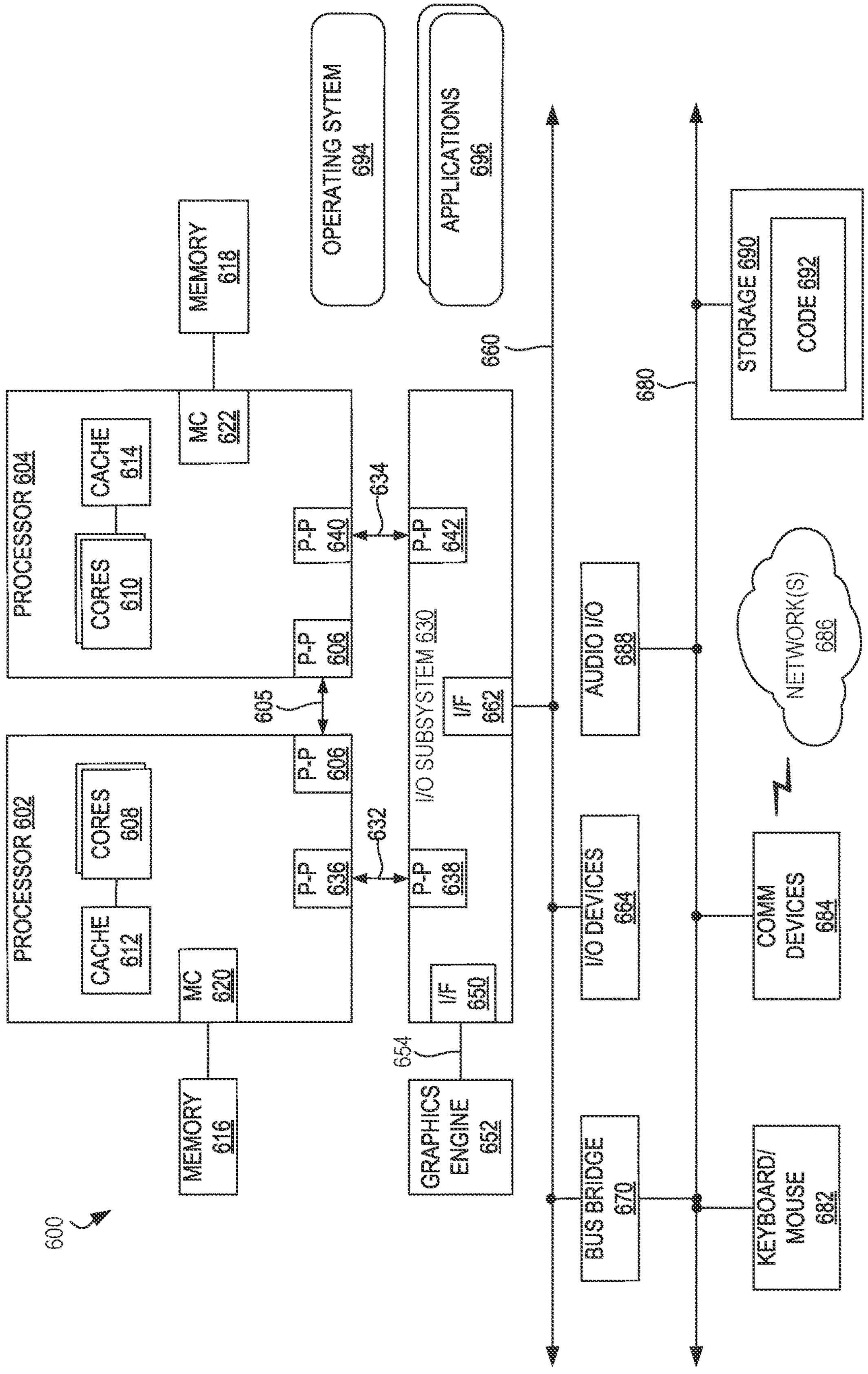
FIG. 6 is a block diagram of an example computing system in which technologies described herein may be implemented.

FIG. 6 is a block diagram of an example computing system in which technologies described herein may be implemented. Generally, components shown in FIG. 6 can communicate with other shown components, although not all connections are shown, for ease of illustration. The computing system 600 is a multiprocessor system comprising a first processor unit 602 and a second processor unit 604 comprising point-to-point (P-P) interconnects. A point-to-point (P-P) interface 606 of the processor unit 602 is coupled to a point-to-point interface 606 of the processor unit 604 via a point-to-point interconnection 605. It is to be understood that any or all of the point-to-point interconnects illustrated in FIG. 6 can be alternatively implemented as a multi-drop bus, and that any or all buses illustrated in FIG. 6 could be replaced by point-to-point interconnects.

The processor units 602 and 604 comprise multiple processor cores. Processor unit 602 comprises processor cores 608 and processor unit 604 comprises processor cores 610. Processor cores 608 and 610 can execute computer-executable instructions in a manner similar to that discussed below in connection with FIG. 7, or other manners.

Processor units 602 and 604 further comprise cache memories 612 and 614, respectively. The cache memories 612 and 614 can store data (e.g., instructions) utilized by one or more components of the processor units 602 and 604, such as the processor cores 608 and 610. The cache memories 612 and 614 can be part of a memory hierarchy for the computing system 600. For example, the cache memories 612 can locally store data that is also stored in a memory 616 to allow for faster access to the data by the processor unit 602. In some embodiments, the cache memories 612 and 614 can comprise multiple cache levels, such as level 1 (L1), level 2 (L2), level 3 (L3), level 4 (L4) and/or other caches or cache levels. In some embodiments, one or more levels of cache memory (e.g., L2, L3, L4) can be shared among multiple cores in a processor unit or among multiple processor units in an integrated circuit component. In some embodiments, the last level of cache memory on an integrated circuit component can be referred to as a last level cache (LLC). One or more of the higher levels of cache levels (the smaller and faster caches) in the memory hierarchy can be located on the same integrated circuit die as a processor core and one or more of the lower cache levels (the larger and slower caches) can be located on integrated circuit dies that are physically separate from the processor core integrated circuit dies.

Although the computing system 600 is shown with two processor units, the computing system 600 can comprise any number of processor units. Further, a processor unit can comprise any number of processor cores. A processor unit can take various forms such as a central processor unit (CPU), a graphics processor unit (GPU), general-purpose GPU (GPGPU), accelerated processor unit (APU), field-programmable gate array (FPGA), neural network processor unit (NPU), data processor unit (DPU), accelerator (e.g., graphics accelerator, digital signal processor (DSP), compression accelerator, artificial intelligence (AI) accelerator), controller, or other types of processor units. As such, the processor unit can be referred to as an XPU (or xPU). Further, a processor unit can comprise one or more of these various types of processor units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

Any artificial intelligence, machine-learning model, or deep learning model, such as a neural network (e.g., recurrent neural network, LSTM recurrent neural network) may be implemented in software, in programmable circuitry (e.g., field-programmable gate array), hardware, or any combination thereof. In embodiments where a model or neural network is implemented in hardware or programmable circuitry, the model or neural network can be described as "circuitry". Thus, in some embodiments, the system state attention network, degradation detection network, and/or root cause classification network can be referred to as system state attention network circuitry, degradation detection network circuitry, and root cause classification network circuitry.

In some embodiments, the computing system 600 can comprise one or more processor units (or processing units) that are heterogeneous or asymmetric to another processor unit in the computing system. There can be a variety of differences between the processor units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 602 and 604 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetry can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 602 and 604 further comprise memory controller logic (MC) 620 and 622. As shown in FIG. 6, MCs 620 and 622 control memories 616 and 618 coupled to the processor units 602 and 604, respectively. The memories 616 and 618 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 620 and 622 are illustrated as being integrated into the processor units 602 and 604, in alternative embodiments, the MCs can be external to a processor unit.

Processor units 602 and 604 are coupled to an Input/Output (I/O) subsystem 630 via point-to-point interconnections 632 and 634. The point-to-point interconnection 632 connects a point-to-point interface 636 of the processor unit 602 with a point-to-point interface 638 of the I/O subsystem 630, and the point-to-point interconnection 634 connects a point-to-point interface 640 of the processor unit 604 with a point-to-point interface 642 of the I/O subsystem 630. Input/Output subsystem 630 further includes an interface 650 to couple the I/O subsystem 630 to a graphics engine 652. The I/O subsystem 630 and the graphics engine 652 are coupled via a bus 654.

The Input/Output subsystem 630 is further coupled to a first bus 660 via an interface 662. The first bus 660 can be a Peripheral Component Interconnect Express (PCIe) bus or any other type of bus. Various I/O devices 664 can be coupled to the first bus 660. A bus bridge 670 can couple the first bus 660 to a second bus 680. In some embodiments, the second bus 680 can be a low pin count (LPC) bus. Various devices can be coupled to the second bus 680 including, for example, a keyboard/mouse 682, audio I/O devices 688, and a storage device 690, such as a hard disk drive, solid-state drive, or another storage device for storing computer-executable instructions (code) 692 or data. The code 692 can comprise computer-executable instructions for performing methods described herein. Additional components that can be coupled to the second bus 680 include communication device(s) 684, which can provide for communication between the computing system 600 and one or more wired or wireless networks 686 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 684 support wireless communication, the communication devices 684 can comprise wireless communication components coupled to one or more antennas to support communication between the computing system 600 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiple Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 600 can comprise removable memory such as flash memory cards (e.g., SD (Secure Digital) cards), memory sticks, Subscriber Identity Module (SIM) cards. The memory in system 600 (including caches 612 and 614, memories 616 and 618, and storage device 690) can store data and/or computer-executable instructions for executing an operating system 694 and application programs 696. Example data includes web pages, text messages, images, sound files, and video data to be sent to and/or received from one or more network servers or other devices by the system 600 via the one or more wired or wireless networks 686, or for use by the system 600. The system 600 can also have access to external memory or storage (not shown) such as external hard drives or cloud-based storage.

The operating system 694 can control the allocation and usage of the components illustrated in FIG. 6 and support the one or more application programs 696. The application programs 696 can include common computing system applications (e.g., email applications, calendars, contact managers, web browsers, messaging applications) as well as other computing applications.

In some embodiments, a hypervisor (or virtual machine manager) operates on the operating system 694 and the application programs 696 operate within one or more virtual machines operating on the hypervisor. In these embodiments, the hypervisor is a type-2 or hosted hypervisor as it is running on the operating system 694. In other hypervisor-based embodiments, the hypervisor is a type-1 or "bare-metal" hypervisor that runs directly on the platform resources of the computing system 600 without an intervening operating system layer.

In some embodiments, the applications 696 can operate within one or more containers. A container is a running instance of a container image, which is a package of binary images for one or more of the applications 696 and any libraries, configuration settings, and any other information that one or more applications 696 need for execution. A container image can conform to any container image format, such as Docker®, Appc, or LXC container image formats. In container-based embodiments, a container runtime engine, such as Docker Engine, LXC, or an open container initiative (OCI)-compatible container runtime (e.g., Railcar, CRI-O) operates on the operating system (or virtual machine monitor) to provide an interface between the containers and the operating system 694. An orchestrator can be responsible for management of the computing system 600 and various container-related tasks such as deploying container images to the computing system 600, monitoring the performance of deployed containers, and monitoring the utilization of the resources of the computing system 600.

The computing system 600 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 600. External input and output devices can communicate with the system 600 via wired or wireless connections.

In addition, the computing system 600 can provide one or more natural user interfaces (NUIs). For example, the operating system 694 or applications 696 can comprise speech recognition logic as part of a voice user interface that allows a user to operate the system 600 via voice commands. Further, the computing system 600 can comprise input devices and logic that allows a user to interact with computing system 600 via body, hand or face gestures.

The system 600 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 600 can further comprise one or more additional antennas coupled to one or more additional receivers, transmitters, and/or transceivers to enable additional functions.

In addition to those already discussed, integrated circuit components, integrated circuit constituent components, and other components in the computing system 600 can communicate with interconnect technologies such as Intel® QuickPath Interconnect (QPI), Intel® Ultra Path Interconnect (UPI), Compute Express Link (CXL), cache coherent interconnect for accelerators (CCIX®), serializer/deserializer (SERDES), Nvidia® NVLink, ARM Infinity Link, Gen-Z, or Open Coherent Accelerator Processor Interface (OpenCAPI). Other interconnect technologies may be used and a computing system 600 may utilize one or more interconnect technologies.

It is to be understood that FIG. 6 illustrates only one example computing system architecture. Computing systems based on alternative architectures can be used to implement technologies described herein. For example, instead of the processors 602 and 604 and the graphics engine 652 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 6. Moreover, the illustrated components in FIG. 6 are not required or all-inclusive, as shown components can be removed and other components added in alternative embodiments.

Figure 7:
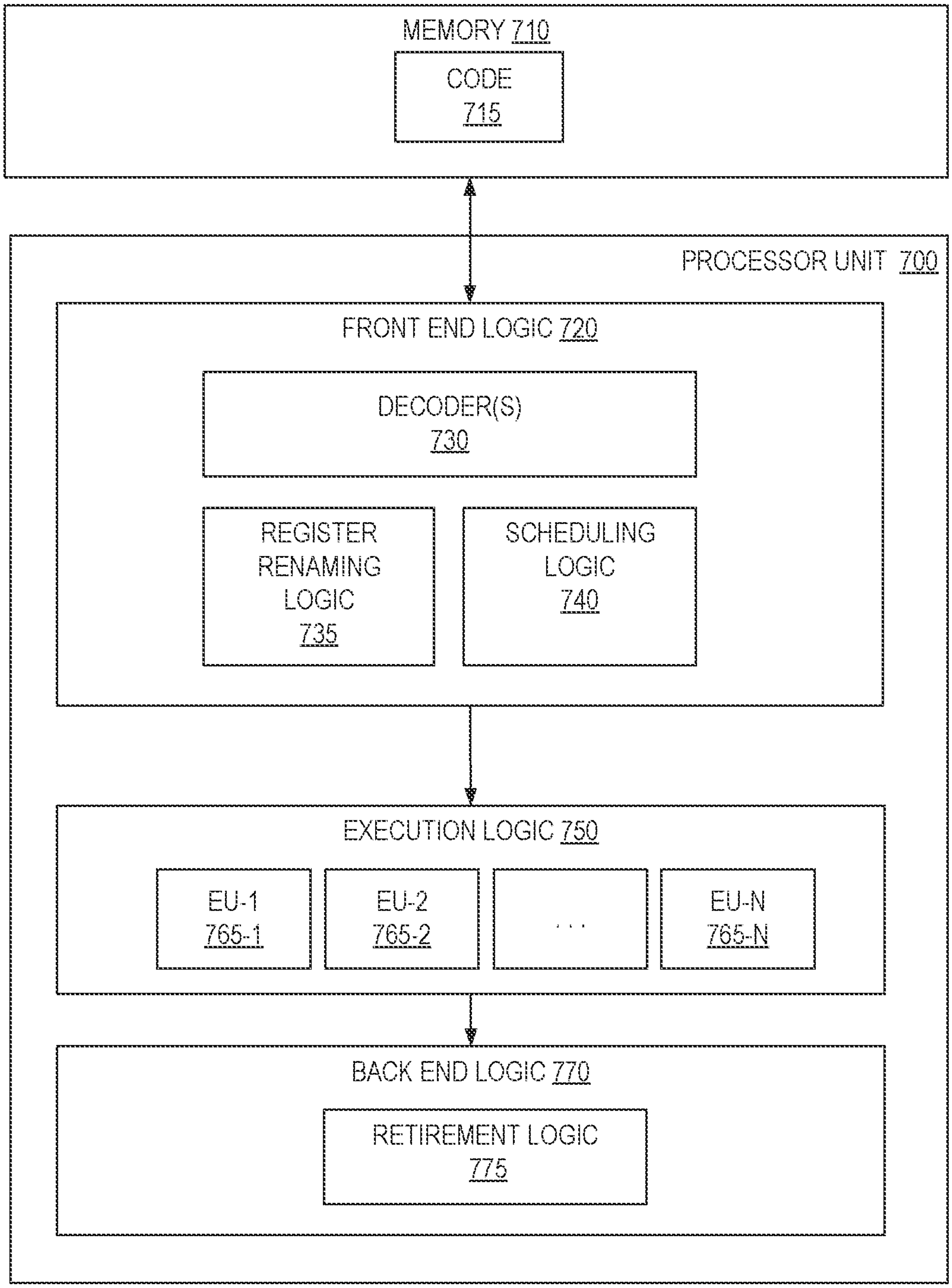
FIG. 7 is a block diagram of an example processor unit to execute computer-executable instructions as part of implementing technologies described herein.

FIG. 7 is a block diagram of an example processor unit 700 to execute computer-executable instructions as part of implementing technologies described herein. The processor unit 700 can be a single-threaded core or a multithreaded core in that it may include more than one hardware thread context (or "logical processor") per processor unit.

FIG. 7 also illustrates a memory 710 coupled to the processor unit 700. The memory 710 can be any memory described herein or any other memory known to those of skill in the art. The memory 710 can store computer-executable instructions 715 (code) executable by the processor unit 700.

The processor unit comprises front-end logic 720 that receives instructions from the memory 710. An instruction can be processed by one or more decoders 730. The decoder 730 can generate as its output a micro-operation such as a fixed width micro-operation in a predefined format, or generate other instructions, microinstructions, or control signals, which reflect the original code instruction. The front-end logic 720 further comprises register renaming logic 735 and scheduling logic 740, which generally allocate resources and queue operations corresponding to converting an instruction for execution.

The processor unit 700 further comprises execution logic 750, which comprises one or more execution units (EUs) 765-1 through 765-N. Some processor unit embodiments can include a number of execution units dedicated to specific functions or sets of functions. Other embodiments can include only one execution unit or one execution unit that can perform a particular function. The execution logic 750 performs the operations specified by code instructions. After completion of execution of the operations specified by the code instructions, back-end logic 770 retires instructions using retirement logic 775. In some embodiments, the processor unit 700 allows out of order execution but requires in-order retirement of instructions. Retirement logic 775 can take a variety of forms as known to those of skill in the art (e.g., re-order buffers or the like).

The processor unit 700 is transformed during execution of instructions, at least in terms of the output generated by the decoder 730, hardware registers and tables utilized by the register renaming logic 735, and any registers (not shown) modified by the execution logic 750.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processor units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: detecting, by a computing system, a user experience degradation event based on one or more system state vectors and one or more user interaction state vectors, individual of the system state vectors representing a state of the computing system at a point in time and individual of the user interaction state vectors representing a state of user interaction with the computing system at a point in time; and classifying, by the computing system, a root cause of the user experience degradation event, the classifying based on the user experience degradation event, the one or more system state vectors, and the one or more user interaction state vectors.

Example 2 comprises the method of example 1, wherein detecting the user experience degradation event is performed by a degradation detection network.

Example 3 comprises the method of example 2, wherein the degradation detection network is a neural network.

Example 4 comprises the method of example 2, wherein the degradation detection network is a recurrent neural network.

Example 5 comprises the method of any one of examples 1-4, further comprising generating the one or more system state vectors based on system data.

Example 6 comprises the method of example 5, wherein the system data comprises telemetry information provided by one or more integrated circuit components of the computing system.

Example 7 comprises the method of example 5 or 6, wherein the system data comprises telemetry information provided by an operating system executing on the computing system.

Example 8 comprises the method of any one of examples 5-7, wherein the system data comprises telemetry information provided by one or more applications executing on the computing system.

Example 9 comprises the method of any one of examples 5-8, wherein the system data comprises computing system configuration information.

Example 10 comprises the method of any one of examples 5-9, wherein the one or more system state vectors are generated based on the system data by a system state attention network.

Example 11 comprises the method of any one of examples 5-10, wherein individual of the system state vectors comprise a first number of values, the system data comprises one or more sets of a second number of values, the first number of values being less than the second number of values.

Example 12 comprises the method of any one of examples 1-11, further comprising generating the one or more user interaction state vectors based on user interaction data.

Example 13 comprises the method of example 12, wherein the user interaction data comprises information indicating user interaction with one or more of a mouse, keypad, keyboard, and touchscreen.

Example 14 comprises the method of any one of examples 12-13, wherein individual of the user interaction state vectors comprise a first number of values, the user interaction data comprises one or more sets of a second number of values, the first number of values being less than the second number of values.

Example 15 comprises the method of any one of examples 1-14, wherein the one or more user interaction state vectors are generated based on the user interaction data by a user interaction fusion network.

Example 16 comprises the method of example 15, wherein the user interaction fusion network is a neural network.

Example 17 comprises the method of any one of examples 1-16, wherein the detecting the user experience degradation event and the classifying the root cause of the user experience degradation event is performed by the computing system in real-time.

Example 18 comprises the method of any one of examples 1-17, wherein classifying the root cause of the user experience degradation event is performed by a multi-label classifier.

Example 19 comprises the method of any one of examples 1-18, wherein the classified root cause is a hardware responsiveness issue, a software responsiveness issue, or a network responsiveness issue.

Example 20 comprises the method of any one of examples 1-19, further comprising causing display on a display of information indicating one or more of a root cause of the user experience degradation event, a severity of the user experience degradation event, a duration of the user experience degradation event, a start time of the user experience degradation event, an end time of the user experience degradation event, and system data and/or user interaction data associated with a time prior to, during, and/or after the user experience degradation event.

Example 21 comprises the method of example 20, wherein the display is part of the computing system.

Example 22 comprises the method of example 20, wherein the display is connected to the computing system by a wired or wireless connection.

Example 23 comprises the method of any one of examples 12-22, further comprising the computing system annotating the one or more user interaction state vectors with user experience degradation information.

Example 24 comprises the method of example 23, wherein annotating the one or more user interaction state vectors with user experience degradation information is performed in response to the computing system determining that the user interaction data indicates a jiggle of a mouse input device.

Example 25 comprises the method of example 23, wherein the annotating the one or more user interaction state vectors with user experience degradation information is performed in response to the computing system determining that the user interaction data indicates a keyboard key has been pressed more than a threshold number of times within a time period.

Example 26 comprises the method of example 23, wherein the annotating the one or more user interaction state vectors with user experience degradation information in response to the computing system determining that the user interaction data indicates a power button has been held down longer than a threshold number of seconds.

Example 27 comprises the method of example 23, wherein the annotating the one or more user interaction state vectors with user experience degradation information in response to the computing system determining that the user interaction data indicates one or more restarts of the computing system.

Example 28 comprises the method of example 23, wherein the annotating the one or more user interaction state vectors with user experience degradation information in response to the computing system determining that the user interaction data indicates a disconnection of the computing system from an external power supply.

Example 29 comprises the method of any one of examples 1-23, further comprising the computing system annotating the one or more user state vectors with user experience degradation information based on user-supplied information.

Example 30 comprises the method of any one of examples 23-29, wherein the detecting the user experience degradation event is performed by a degradation detection network, wherein the method further comprises the computing system comprises training the degradation detection network based on the one or more system state vectors and the annotated one or more user interaction state vectors.

Example 31 comprises an apparatus, comprising: one or more processor units; and one or more computer-readable media having instructions stored thereon that, when executed, cause the one or more processor units to implement any one of the methods of examples 1-30.

Example 32 comprises one or more computer-readable storage media storing computer-executable instructions that, when executed, cause one or more processor units of a computing device to perform any one of the method of examples 1-30.

Example 33 comprises an apparatus comprising one or more means to perform any one of the method of examples 1-30.

Example 34 comprises an apparatus comprising: a degradation detection means for detecting a user experience degradation event based on one or more system state vectors and one or more user interaction state vectors, individual of the system state vectors representing a state of a computing system at a point in time and individual of the user interaction state vectors representing a state of user interaction with the computing system at a point in time; and a classification means for classifying a root cause of the user experience degradation event based on the user experience degradation event, the one or more system state vectors and the one or more user interaction state vectors.

Example 35 comprises the apparatus of example 34, further comprising generating the system state vectors based on system data.

Example 36 comprises the apparatus of example 35, wherein the system data comprises computing system configuration data.

Example 37 comprises the apparatus of example 36, wherein the system data comprises telemetry information provided by one or more integrated circuit components of the computing system.

Example 38 comprises the apparatus of example 36 or 37, wherein the system data comprises telemetry information provided by an operating system executing on the computing system.

Example 39 comprises the apparatus of any one of examples 36-38, wherein the system data comprises telemetry information provided by one or more applications executing on the computing system.

Example 40 comprises the apparatus of any one of examples 36-39, wherein the system data comprises computing system configuration information.

Example 41 comprises the apparatus of any one of examples 36-40, wherein individual of the system state vectors comprise a first number of values, the system data comprises one or more sets of a second number of values, the first number of values being less than the second number of values.

Example 42 comprises the apparatus of example 34, wherein the one or more user interaction state vectors are generated based on user interaction data.

Example 43 comprises the apparatus of example 42, wherein the user interaction data comprises information indicating user interaction with one or more of a mouse, keypad, keyboard, and touchscreen.

Example 44 comprises the apparatus of any one of examples 42-43, wherein individual of the user interaction state vectors comprise a first number of values, the user interaction data comprises one or more sets of a second number of values, the first number of values being less than the second number of values.

Example 45 comprises the apparatus of any one of examples 35-44, wherein the degradation detection means detects the user experience degradation event and the classification means classifies the root cause of the user experience degradation event in real-time.

Example 46 comprises the apparatus of any one of examples 34-45, wherein the classified root cause is a hardware responsiveness issue, a software responsiveness issue, or a network responsiveness issue.

Example 47 comprises the apparatus of any one of examples 34-46, further comprising one or more processor units, the one or more processor units to cause display on a display of information indicating one or more of: a root cause of the user experience degradation event, a severity of the user experience degradation event, a duration of the user experience degradation event, a start time of the user experience degradation event, an end time of the user experience degradation event, and system data and/or user interaction data associated with a time prior to, during, and/or after the user experience degradation event.

The invention claimed is:

1. One or more non-transitory computer-readable storage media storing computer-executable instructions that, when executed, cause one or more processor units of a computing device to:

detect, by a computing system, a user experience degradation event based on one or more system state vectors and one or more user interaction state vectors, individual of the one or more system state vectors to represent a state of the computing system at a point in time and individual of the one or more user interaction state vectors to represent a state of user interaction with the computing system at a point in time, the one or more user interaction state vectors generated based on user interaction data received from one or more input devices of the computing system, the user interaction data representing input from a user, wherein the user interaction data indicates one or more of a jiggle of a mouse input device, a keyboard key pressed more than a threshold number of times within a time period, a power button held down longer than a threshold number of seconds, one or more restarts of the computing system, and a disconnection of the computing system from an external power supply; and classify, by the computing system, a root cause of the user experience degradation event based on the user experience degradation event, the one or more system state vectors, and the one or more user interaction state vectors.

2. The one or more non-transitory computer-readable storage media of claim 1, wherein to detect the user experience degradation event is performed by a degradation detection network, the degradation detection network being a neural network.

3. The one or more non-transitory computer-readable storage media of claim 1, wherein the computer-executable instructions further cause the one or more processor units to generate the one or more system state vectors based on system data, the system data comprising telemetry information provided by one or more of one or more integrated circuit components of the computing system, an operating system executing on the computing system, and one or more applications executing on the computing system.

4. The one or more non-transitory computer-readable storage media of claim 1, wherein the computer-executable instructions further cause the one or more processor units to generate the one or more system state vectors based on system data, the system data comprising computing system configuration information.

5. The one or more non-transitory computer-readable storage media of claim 1, wherein the one or more system state vectors are generated based on system data by a system state attention network, the system state attention network being a neural network.

6. The one or more non-transitory computer-readable storage media of claim 1, wherein the computer-executable instructions further cause the one or more processor units to generate the one or more user interaction state vectors based on user interaction data, the user interaction data comprising information indicating user interaction with one or more of a mouse, keypad, keyboard, and touchscreen.

7. The one or more non-transitory computer-readable storage media of claim 1, wherein the one or more user interaction state vectors are generated based on user interaction data by a user interaction fusion network, the user interaction fusion network being a neural network.

8. The one or more non-transitory computer-readable storage media of claim 1, wherein to detect the user experience degradation event and to classify the root cause of the user experience degradation event are performed by the computing system in real-time.

9. The one or more non-transitory computer-readable storage media of claim 1, wherein the classified root cause is a hardware responsiveness issue, a software responsiveness issue, or a network responsiveness issue.

10. The one or more non-transitory computer-readable storage media of claim 1, wherein the computer-executable instructions further cause the one or more processor units to cause display on a display of information indicating one or more of a root cause of the user experience degradation event, a severity of the user experience degradation event, a duration of the user experience degradation event, a start time of the user experience degradation event, an end time of the user experience degradation event, and system data and/or user interaction data associated with a time prior to, during, and/or after the user experience degradation event.

11. The one or more non-transitory computer-readable storage media of claim 1, wherein the computer-executable instructions further cause the one or more processor units to annotate the one or more user interaction state vectors with user experience degradation information.

12. The one or more non-transitory computer-readable storage media of claim 1, wherein the computer-executable instructions further cause the one or more processor units to annotate the one or more user interaction state vectors with user experience degradation information based on user-supplied information.

13. The one or more non-transitory computer-readable storage media of claim 12, wherein to detect the user experience degradation event is performed by a degradation detection network, wherein the computer-executable instructions further cause the one or more processor units to train the degradation detection network based on the one or more system state vectors and the annotated one or more user interaction state vectors.

14. A method comprising:

detecting, by a computing system, a user experience degradation event based on one or more system state vectors and one or more user interaction state vectors, individual of the one or more system state vectors representing a state of the computing system at a point in time and individual of the one or more user interaction state vectors representing a state of user interaction with the computing system at a point in time, the one or more user interaction state vectors generated based on user interaction data received from one or more input devices of the computing system, the user interaction data representing input from a user, wherein the user interaction data indicates one or more of a jiggle of a mouse input device, a keyboard key pressed more than a threshold number of times within a time period, a power button held down longer than a threshold number of seconds, one or more restarts of the computing system, and a disconnection of the computing system from an external power supply; and classifying, by the computing system, a root cause of the user experience degradation event, the classifying based on the user experience degradation event, the one or more system state vectors, and the one or more user interaction state vectors.

15. The method of claim 14, further comprising:

generating the one or more system state vectors based on system data; and generating the one or more user interaction state vectors based on user interaction data, the user interaction data comprising information indicating user interaction with one or more of a mouse, keypad, keyboard, and touchscreen.

16. The method of claim 14, wherein the detecting the user experience degradation event and the classifying the root cause of the user experience degradation event are performed by the computing system in real-time.

17. The method of claim 14, further comprising causing display on a display of information indicating one or more of a root cause of the user experience degradation event, a severity of the user experience degradation event, a duration of the user experience degradation event, a start time of the user experience degradation event, an end time of the user experience degradation event, and system data and/or user interaction data associated with a time prior to, during, and/or after the user experience degradation event.

18. The method of claim 14, further comprising the computing system annotating the one or more user interaction state vectors with user experience degradation information, wherein the detecting the user experience degradation event is performed by a degradation detection network, wherein the method further comprises training the degradation detection network based on the one or more system state vectors and the annotated one or more user interaction state vectors.

19. An apparatus, comprising:

one or more processor units; and one or more computer-readable media having computer-executable instructions stored thereon that, when executed, cause the one or more processor units to:

detect, by a computing system, a user experience degradation event based on one or more system state vectors and one or more user interaction state vectors, individual of the one or more system state vectors to represent a state of the computing system at a point in time and individual of the one or more user interaction state vectors to represent a state of user interaction with the computing system at a point in time, the one or more user interaction state vectors generated based on user interaction data received from one or more input devices of the computing system, the user interaction data representing input from a user, wherein the user interaction data indicates one or more of a jiggle of a mouse input device, a keyboard key pressed more than a threshold number of times within a time period, a power button held down longer than a threshold number of seconds, one or more restarts of the computing system, and a disconnection of the computing system from an external power supply; and classify, by the computing system, a root cause of the user experience degradation event based on the user experience degradation event, the one or more system state vectors, and the one or more user interaction state vectors.

20. The apparatus of claim 19, wherein the computer-executable instructions further cause the one or more processor units to:

generate the one or more system state vectors based on system data; and generate the one or more user interaction state vectors based on user interaction data, wherein the user interaction data comprises information indicating user interaction with one or more of a mouse, keypad, keyboard, and touchscreen.

21. The apparatus of claim 19, wherein to detect the user experience degradation event and to classify the root cause of the user experience degradation event are performed by the one or more processor units in real-time.

22. The apparatus of claim 19, wherein the classified root cause is a hardware responsiveness issue, a software responsiveness issue, or a network responsiveness issue.

23. The apparatus of claim 19, wherein the computer-executable instructions further cause the one or more processor units to cause display on a display of information indicating one or more of a root cause of the user experience degradation event, a severity of the user experience degradation event, a duration of the user experience degradation event, a start time of the user experience degradation event, an end time of the user experience degradation event, and system data and/or user interaction data associated with a time prior to, during, and/or after the user experience degradation event.

24. The apparatus of claim 19, wherein the computer-executable instructions further cause the one or more processor units to annotate the one or more user interaction state vectors with user experience degradation information, wherein to detect the user experience degradation event is performed by a degradation detection network, wherein the computer-executable instructions further cause the one or more processor units to train the degradation detection network based on the one or more system state vectors and the annotated one or more user interaction state vectors.

* * * * *